(12) United States Patent
Shumpert

(10) Patent No.: US 10,410,135 B2
(45) Date of Patent: Sep. 10, 2019

(54) SYSTEMS AND/OR METHODS FOR DYNAMIC ANOMALY DETECTION IN MACHINE SENSOR DATA

(71) Applicant: Software AG USA, Inc., Reston, VA (US)

(72) Inventor: James Michael Shumpert, Reston, VA (US)

(73) Assignee: SOFTWARE AG USA, INC., Reston, VA (US)

( * ) Notice: Subject to any disclaimer, the term of this patent is extended or adjusted under 35 U.S.C. 154(b) by 907 days.

(21) Appl. No.: 14/718,277

(22) Filed: May 21, 2015

(65) Prior Publication Data

US 2016/0342903 A1 Nov. 24, 2016

(51) Int. Cl.
*G06N 20/00* (2019.01)
*G06F 11/07* (2006.01)
*G06F 11/00* (2006.01)

(52) U.S. Cl.
CPC ............ *G06N 20/00* (2019.01); *G06F 11/008* (2013.01); *G06F 11/079* (2013.01); *G06F 11/0721* (2013.01)

(58) Field of Classification Search
CPC ...... G06N 99/005; G06N 5/025; G06N 7/005; G06K 9/6256; G06K 9/6269
USPC .......................................................... 706/12
See application file for complete search history.

(56) References Cited

U.S. PATENT DOCUMENTS

| 6,216,066 B1 | 4/2001 | Goebel et al. |
| 6,721,445 B1 | 4/2004 | Azencott |
| 8,266,351 B2 | 9/2012 | Schöning et al. |
| 8,640,089 B2 | 1/2014 | Bates et al. |
| 8,832,674 B2 | 9/2014 | Harris et al. |

(Continued)

FOREIGN PATENT DOCUMENTS

WO 2013/077861 5/2013

OTHER PUBLICATIONS

Zhong et al.—2005—"Improved K-Means Clustering Algorithm for Exploring Local Protein Sequence Motifs Representing Common Structural Property"—http://citeseerx.ist.psu.edu/viewdoc/download? (Year: 2005).*

(Continued)

*Primary Examiner* — Scott A. Waldron
*Assistant Examiner* — Viker A Lamardo
(74) *Attorney, Agent, or Firm* — Nixon & Vanderhye P.C.

(57) ABSTRACT

Certain example embodiments relate to techniques for detecting anomalies in streaming data. More particularly, certain example embodiments use an approach that combines both unsupervised and supervised machine learning techniques to create a shared anomaly detection model in connection with a modified k-means clustering algorithm and advantageously also enables concept drift to be taken into account. The number of clusters k need not be known in advance, and it may vary over time. Models are continually trainable as a result of the dynamic reception of data over an unknown and potentially indefinite time period, and clusters can be built incrementally and in connection with an updatable distance threshold that indicates when a new cluster is to be created. Distance thresholds also are dynamic and adjustable over time.

36 Claims, 13 Drawing Sheets

(56) References Cited

U.S. PATENT DOCUMENTS

| | | | | |
|---|---|---|---|---|
| 2005/0091532 | A1* | 4/2005 | Moghe | H04L 63/1408 726/4 |
| 2007/0289013 | A1* | 12/2007 | Lim | G06F 21/552 726/22 |
| 2012/0137367 | A1* | 5/2012 | Dupont | G06F 21/00 726/25 |
| 2012/0159622 | A1* | 6/2012 | Lee | G06F 21/55 726/22 |
| 2012/0284211 | A1* | 11/2012 | Datta | G06F 11/0751 706/11 |
| 2012/0316835 | A1* | 12/2012 | Maeda | G01D 3/08 702/183 |
| 2013/0046725 | A1 | 2/2013 | Cammert et al. | |
| 2013/0060524 | A1 | 3/2013 | Liao | |
| 2013/0211706 | A1* | 8/2013 | MacNaughtan | G08G 1/0112 701/410 |
| 2014/0025700 | A1 | 1/2014 | Schöning | |
| 2014/0078163 | A1 | 3/2014 | Cammert et al. | |
| 2015/0163121 | A1* | 6/2015 | Mahaffey | G06F 11/0766 707/687 |
| 2016/0021026 | A1* | 1/2016 | Aron | H04L 47/827 709/226 |
| 2016/0219066 | A1* | 7/2016 | Vasseur | H04L 63/1425 |
| 2016/0337441 | A1* | 11/2016 | Bloomquist | G06F 9/5061 |

OTHER PUBLICATIONS

Celebi et al.—2012—"A Comparative Study of Efficient Initialization Methods for the K-Means Clustering Algorithm"—https://arxix.org/pdf/1209.1960.pdf (Year:2012).*

Schwämmle et al.—2010—"A simple and fast method to determine the parameters for fuzzy c-means cluster analysis"—https://academic.oup.conn/bioinformatics/article/26/22/2841/227572 (Year: 2010).*

Arshad et al.—2003—"Identifying outliers via clustering for anomaly detection"—https://www.researchgate.net/publication/228938282_Identifying_outliers_via_clustering_for_anomaly_detection (Year: 2003).*

Yi Zhang—"Active Learning"—https://www.cs.cmu.edu/~tom/10701_sp11/recitations/Recitation_13.pdf (Year: 2011).*

Nir Ailon et al., "Streaming κ-Means Approximation," Advances in Neural Information Processing Systems 22, Neural Information Processing Systems (NIPS) 2009, pp. 1-9.

"What is Apache Mahout?" retrieved May 7, 2015, pp. 1-2.

Alexey Tsymbal et al., "The Problem of Concept: Definitions and Related Work," Apr. 29, 2004, pp. 1-7.

* cited by examiner

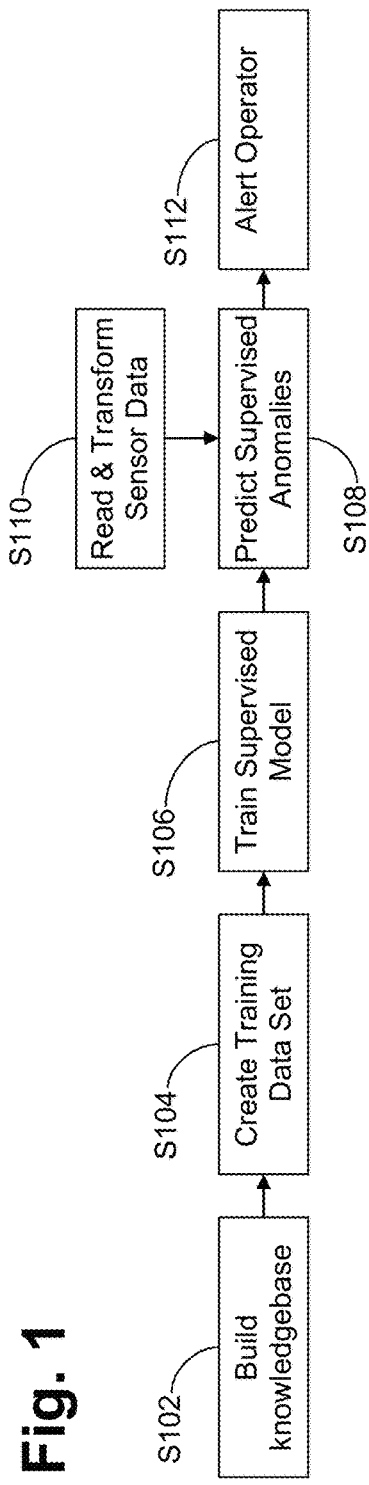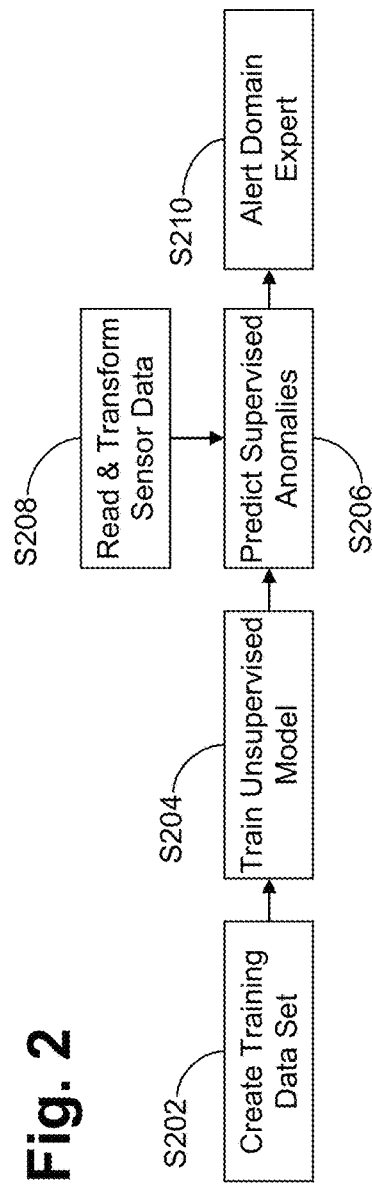

| modelNumber | serialNumber | internal | eventId | itemName | itemTimestamp | itemType | itemValue |
|---|---|---|---|---|---|---|---|
| 6500CXY | 42001 | false | 1d22a609-a192-f4ee-0000-000001d8c283 | Current | 2014-10-31T16:00:25.615Z | analog | 0.74310975 |
| 6500CXY | 42004 | false | 1d22a609-a192-f4ee-0000-000001d8c295 | Temperature | 2014-10-31T16:00:25.940Z | analog | 7.209825253 |
| 6500CXY | 42002 | false | 1d22a609-a192-f4ee-0000-000001d8c2a7 | Vibration | 2014-10-31T16:00:26.131Z | analog | 3.315367925 |
| 6500CXY | 42005 | false | 1d22a609-a192-f4ee-0000-000001d8c2aa | RunningTime | 2014-10-31T16:00:26.131Z | analog | 153557.0296 |
| 6500CXY | 42006 | false | 1d22a609-a192-f4ee-0000-000001d8c2b9 | FlowRate | 2014-10-31T16:00:26.244Z | analog | 1170048.973 |
| 6500CXY | 42003 | false | 1d22a609-a192-f4ee-0000-000001d8c2bf | Load | 2014-10-31T16:00:26.568Z | analog | 1787.67287 |
| 6500CXY | 42001 | false | 1d22a609-a192-f4ee-0000-000001d8c2cb | FlowRate | 2014-10-31T16:00:26.635Z | analog | 83926.23804 |
| 6500CXY | 42004 | false | 1d22a609-a192-f4ee-0000-000001d8c2dd | Vibration | 2014-10-31T16:00:26.961Z | analog | 4.482715201 |
| 6500CXY | 42002 | false | 1d22a609-a192-f4ee-0000-000001d8c2ef | Level | 2014-10-31T16:00:27.151Z | analog | -1056.154738 |
| 6500CXY | 42005 | false | 1d22a609-a192-f4ee-0000-000001d8c2f2 | Load | 2014-10-31T16:00:27.155Z | analog | 957.0405766 |
| 6500CXY | 42006 | false | 1d22a609-a192-f4ee-0000-000001d8c301 | WaterFraction | 2014-10-31T16:00:27.264Z | analog | 23.83163404 |
| 6500CXY | 42003 | false | 1d22a609-a192-f4ee-0000-000001d8c307 | Angle | 2014-10-31T16:00:27.589Z | analog | 0.01771623 |
| 6500CXY | 42001 | false | 1d22a609-a192-f4ee-0000-000001d8c313 | WaterFraction | 2014-10-31T16:00:27.657Z | analog | 56.4845772 |

Fig. 6

| instanceId | time | device | angle | current | flowRate | level | load | pressure | temperature | vibration | waterFraction |
|---|---|---|---|---|---|---|---|---|---|---|---|
| 1d22a601 | 16:00:31 | 42001 | 0.018020083 | 0.742449391 | 89933.34545 | -580.3991436 | 292.3145754 | 212.0539738 | 2.634309415 | 3.176536202 | 52.41893564 |
| 1d22a602 | 16:00:43 | 42001 | 0.011533371 | 0.70668664 | 249556.8833 | -1019.950891 | 1296.633867 | 78.05427362 | 7.761551744 | 3.054874973 | 47.30514061 |
| 1d22a603 | 16:00:56 | 42001 | 0.006298207 | 1.446696067 | 194271.1101 | -1462.245209 | 2918.367078 | 498.8874045 | 0.970534768 | 0.412980794 | 59.37429143 |
| 1d22a604 | 16:01:08 | 42001 | 0.000588024 | 1.344738383 | 150168.1624 | -1334.122037 | 2354.263237 | 473.1519703 | 5.044161065 | 4.512030617 | 25.83263292 |
| 1d22a605 | 16:01:20 | 42001 | 0.020459219 | 0.897966886 | 210809.1104 | -666.0296548 | 2987.904938 | 141.6455802 | 2.804216588 | 0.66539413 | 21.94624523 |
| 1d22a606 | 16:01:32 | 42001 | 0.007567774 | 1.178840723 | 194457.6209 | -1115.290503 | 3154.245348 | 202.8438137 | 5.854127218 | 1.278826803 | 57.85335336 |
| 1d22a607 | 16:01:45 | 42001 | 0.0031341 | 1.182533496 | 22604.05614 | -1594.746386 | 1754.300525 | 336.5495721 | 1.814245223 | 5.284513742 | 2.287870882 |
| 1d22a608 | 16:01:57 | 42001 | 0.002274252 | 0.34599469 | 181024.7295 | -346.2493289 | 2110.365821 | 23.81150605 | 5.119975174 | 0.432372863 | 64.339835 |
| 1d22a609 | 16:02:09 | 42001 | 0.009072296 | 1.359337126 | 122214.3818 | -502.7417553 | 345.1699932 | 240.8936393 | 8.457705125 | 3.374751665 | 70.82348591 |
| 1d22a610 | 16:02:22 | 42001 | 1.57E-04 | 0.718808127 | 226537.1696 | -499.3198566 | 2676.420505 | 519.1457584 | 2.711375473 | 0.465235939 | 67.11123057 |
| 1d22a611 | 16:02:34 | 42001 | 0.002578474 | 0.811114464 | 71835.77643 | -1016.87499 | 1105.168261 | 336.643447 | 7.30630188 | 2.734398508 | 63.73347059 |
| 1d22a612 | 16:02:46 | 42001 | 0.016335209 | 0.748886861 | 187031.0514 | -1517.826779 | 1208.798511 | 279.9376584 | 6.148636612 | 4.99250215 | 46.27970776 |

Fig. 7

| instanceId | time | device | angle | current | flowRate | level | load | pressure | temperature | vibration | waterFraction | label |
|---|---|---|---|---|---|---|---|---|---|---|---|---|
| 1d22a601 | 16:00:31 | 42001 | 0.018020083 | 0.742449391 | 89933.34545 | -580.3991436 | 292.3145754 | 212.0539738 | 2.634309415 | 3.176536202 | 52.41893564 | n |
| 1d22a602 | 16:00:43 | 42001 | 0.011533371 | 0.70668664 | 249556.8833 | -1019.950891 | 1296.633867 | 78.05427362 | 7.761551744 | 3.054874973 | 47.30514061 | n |
| 1d22a603 | 16:00:56 | 42001 | 0.006298207 | 1.446696067 | 194271.1101 | -1462.245209 | 2918.367078 | 498.8874045 | 0.970534768 | 0.412980794 | 59.37429143 | n |
| 1d22a604 | 16:01:08 | 42001 | 0.000588024 | 1.344738383 | 150168.1624 | -1334.122037 | 2354.263237 | 473.1519703 | 5.044161065 | 4.512030617 | 25.83263292 | n |
| 1d22a605 | 16:01:20 | 42001 | 0.020459219 | 0.897966886 | 210809.1104 | -666.0296548 | 2987.904938 | 141.6455802 | 2.804216588 | 0.66539413 | 21.94624523 | n |
| 1d22a606 | 16:01:32 | 42001 | 0.007567774 | 1.178840723 | 194457.6209 | -1115.290503 | 3154.245348 | 202.8438137 | 5.854127218 | 1.278826803 | 57.85335336 | n |
| 1d22a607 | 16:01:45 | 42001 | 0.0031341 | 1.182533496 | 22604.05614 | -1594.746386 | 1754.300525 | 336.5495721 | 1.814245223 | 5.284513742 | 2.287870882 | a |
| 1d22a608 | 16:01:57 | 42001 | 0.002274252 | 0.345994469 | 181024.7295 | -346.2493289 | 2110.365821 | 23.81150605 | 5.119975174 | 0.432372863 | 64.339835 | n |
| 1d22a609 | 16:02:09 | 42001 | 0.009072296 | 1.359337126 | 122214.3818 | -502.7417553 | 345.1699932 | 240.8936393 | 8.425705125 | 3.374751665 | 70.82348591 | n |
| 1d22a610 | 16:02:22 | 42001 | 1.57E-04 | 0.718808127 | 226537.1696 | -499.3198566 | 2676.420505 | 519.1457584 | 2.711375473 | 0.465235939 | 67.11123057 | a |
| 1d22a611 | 16:02:34 | 42001 | 0.002578474 | 0.811114464 | 71835.77643 | -1016.87499 | 1105.168261 | 336.643447 | 7.30630188 | 2.734398508 | 63.73347059 | n |
| 1d22a612 | 16:02:46 | 42001 | 0.016335209 | 0.748886861 | 187031.0514 | -1517.826779 | 1208.798511 | 279.9376584 | 6.148636612 | 4.99250215 | 46.27970776 | n |

Fig. 8

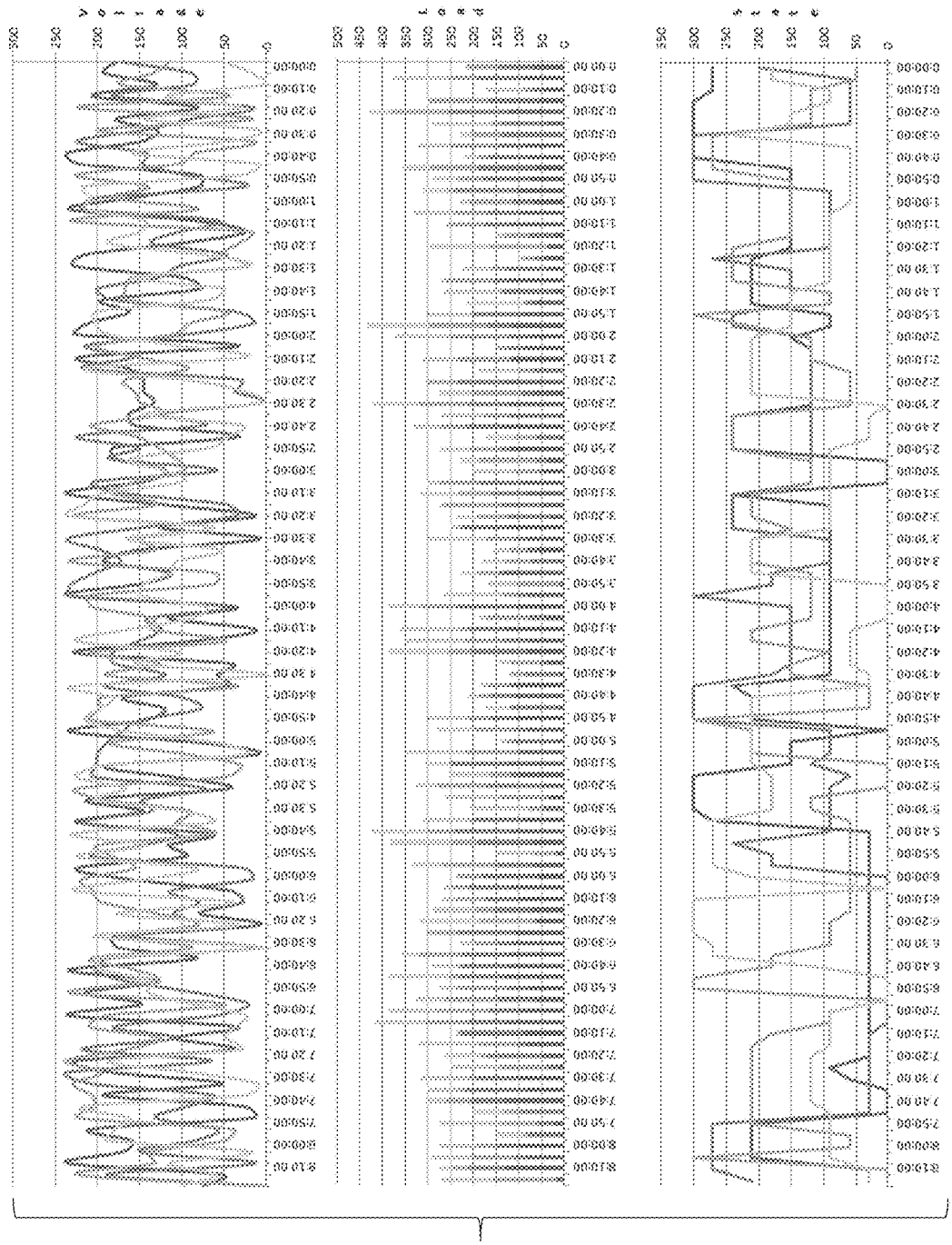

SYSTEMS AND/OR METHODS FOR DYNAMIC ANOMALY DETECTION IN MACHINE SENSOR DATA

TECHNICAL FIELD

Certain example embodiments described herein relate to systems and/or methods for dynamic anomaly detection in machine sensor data. More particularly, certain example embodiments described herein relate to techniques for detecting anomalies in streaming data, using an approach that combines both unsupervised and supervised machine learning techniques to create a shared anomaly detection model in connection with a modified k-means clustering algorithm and advantageously also enables concept drift to be taken into account.

BACKGROUND AND SUMMARY

The recent availability of very inexpensive sensors has resulted in an explosion of real-time, operational machine data. The analysis of data from such sensor sources can be important in a variety of contexts. For instance, it is desirable to analyze sensor data to look for anomalies in how medicinal tablets are sorted to help reduce the likelihood of cross-contamination between different types of medicines, credit card purchases to identify potential fraudulent activities, temperature and/or humidity readings to ensure that foodstuffs being shipped are not likely to spoil during transit, etc.

Similarly, in what is sometimes called the Internet-of-Things (IoT), machine data oftentimes is used for monitoring the health and condition of the machinery in order to allow for faster, more efficient maintenance. The IoT concept is based on the idea of "everything" being connected, especially when it comes to uniquely identifiable embedded computing like devices within the existing Internet infrastructure. Just as mobile devices are connected, the IoT industry posits that (otherwise) ordinary, everyday consumer products and infrastructure, such as cars, refrigerators, homes, roads, human health sensors, etc., soon will be interconnected. In brief, the IoT is expected to offer advanced connectivity of devices, systems, and services that goes beyond machine-to-machine communications, while covering a variety of protocols, domains, and applications.

It will be appreciated that there is a vast number of potential data producers, and that the data produced may be generated quickly and in large amounts, and may change frequently. As a result, in the IoT and other contexts, it would be desirable to be able to evaluate streaming data as the sensors send it, e.g., so that deteriorating equipment can be identified and problems addressed before catastrophic or other failures occur. Indeed, streaming data typically includes a payload from a sensor or the like along with a timestamp and typically cannot be stored because of the high volume and rate of transmission and thus must be analyzed on-the-fly. In other words, it will be appreciated that it would be advantageous to detect anomalies in streaming sensor data.

A variety of anomaly detection approaches have developed over time. For example, some early approaches used simple thresholds for individual sensors and raised an alarm if any of those thresholds were exceeded. This is typically called univariate analysis.

Such techniques can be improved by incorporating different models for different operational states (e.g., accelerating or decelerating), but the detection approach basically still relies upon the deviation of a key parameter. Although this approach works adequately for some failure modes, a degradation scenario oftentimes is much more complex and is difficult to discover without a simultaneously performed analysis of data from multiple sensors, e.g., in accordance with what oftentimes is called multivariate analysis.

Current multivariate analysis approaches may be thought of as falling into one of two groups, categorized by how they use machine learning to create the anomaly detection model, namely, supervised and unsupervised approaches. Supervised learning approaches generally require a knowledgebase of existing, known failures and the sensor data readings surrounding the time of the failure. With this technique, one can use a data set of labeled/classified (i.e., normal or anomalous) sensor readings and train a predictive model to recognize the difference between the two. The resulting model can then be used to predict the classification of current instances of sensor readings.

An example supervised learning approach may, for instance, use various multivariate clustering algorithms that are trained on learning data sets in order to classify later observations as normal or anomalous. Another example may, for instance, use case-based reasoning to determine and explain what type of fault exists, with the anomaly detection algorithm itself relying on previously prepared sets of learning data. In such cases, multiple learning data sets may be created to cover the operational scenarios of old equipment, operating conditions, etc. Thus, it will be appreciated that a machine learning algorithm uses supervised learning if the creation of the model requires the use of training data including example inputs and labeled outputs.

By contrast, unsupervised learning approaches do not require a knowledgebase of known problems and thus may be able to detect problems never seen before. The predictive models still need to be trained, but the learning data can merely include sensor data collected under normal operating conditions. Thus, it will be appreciated that a machine learning algorithm uses unsupervised learning if it is able to learn something about the structure of the training data without labeled outputs.

Unsupervised learning and supervised learning approaches have been combined into what is sometimes called semi-supervised learning. However, in general, an assumption is made that the system primarily is performing (a) supervised learning, with the use of additional unlabeled data to increase performance, or (b) unsupervised learning, with the use of labeled data to impose additional constraints. Thus, generally speaking, these approaches assume a pre-existing, labeled training data set (along with unlabeled data).

The k-means algorithm is a popular unsupervised learning approach that can also be adapted for supervised learning. Its chief weakness, however, is that the number of clusters k must be known upfront. In the academic world, there has been some research into creation of a streaming version of the algorithm; e.g., a version that can learn from data as it is continuously received. Streaming algorithms are difficult to develop, however, as they typically need to be able to deal with the practical limits of how much data can be stored in memory and the fact that, once the data is released, there is no practical way to get it back.

One example streaming version of k-means estimates the clusters using samples of the data, although the number of clusters k must be known in advance. Another example approach uses a two-step, mini-batch method where the results of the first step must be stored until it is time to run the second step as a batch. In this case, the size of the batch must be determined by the user and, again, the number of clusters k must be known in advance.

It will be appreciated that both supervised and unsupervised learning approaches can suffer from the problem of concept drift, where the normal operating parameters change over time. Concepts are often not always stable in the real world. For instance, weather prediction rules and customers' preferences oftentimes change over time. The underlying data distribution may change, as well. Thus, through naturally occurring changes, a model built on old data may become inconsistent with the new data, and/or old concepts may become inconsistent with new concepts. Updating of the model thus may be necessary. The problem of concept drift, therefore complicates the task of learning.

As noted above, univariate analysis works adequately for some failures, but often the degradation scenario is much more complex and requires the simultaneous analysis of data from multiple sensors. Also, multivariate analysis typically can detect emerging problems earlier than single-sensor thresholds, since the latter is often not detected until a component failure has already occurred.

Multivariate supervised learning approaches typically require a knowledgebase of existing, known failures and the sensor data readings surrounding the time of the failure. Such knowledgebase can be expensive and time consuming to create, and these approaches typically only capture problems that have been seen before.

Multivariate unsupervised learning approaches do not require such a knowledgebase and can detect new problems, but they oftentimes suffer from false alarms being erroneously generated (e.g., as a result of detecting a rare, but not necessarily problematic, event). They also generally cannot provide any prescriptive aid to maintenance operators. For instance, it is oftentimes difficult or impossible to provide information, such as likely causes of the event, best course of action to remediate the problem, etc.

A disadvantage of existing supervised, unsupervised, and semi-supervised learning approaches, especially when it comes to IoT and/or similar anomaly detection, is that they require a data set of training examples (whether labeled or not) to be collected upfront before the model can be trained to start looking for anomalies. In the case of unsupervised learning, the training data is not labeled, but it needs to contain only normal examples of sensor data. Current approaches require offline, batch model training and evaluation by a machine learning expert before the system can start monitoring for IoT and/or similar anomalies.

As explained above, one weakness of the k-means algorithm is that the number of clusters k must be known upfront. For a streaming application with machine sensor data, the number of clusters of normal and anomalous behavior is unknown, making this approach impractical. Thus, existing streaming k-means algorithms are not well suited for use with machine sensor data. Also, existing streaming k-means algorithms make different tradeoffs in their handling of the volume and velocity of streaming data, generally choosing either to sample it, or to process it in mini-batches. Neither approach takes full, continuous advantage of all the data available.

Current machine sensor anomaly detection approaches typically do not address the problem of concept drift. The failure to account for concept drift can eventually lead to false or missed alarms, e.g., unless the predictive model is updated. However, knowing when to update the model often requires specific domain expertise for the machinery in question. As a result, these approaches often degrade in accuracy and require a significant amount of maintenance.

Certain example embodiments address the above and/or other concerns.

One aspect of certain example embodiments relates to systems and/or methods for detecting novel and/or anomalous events across multiple sensors that automatically start with live data, learn and adapt as they go, facilitate the input of human operators to guide machine learning, and coordinate necessary maintenance and/or other responses as appropriate. Certain example embodiments implement both unsupervised and supervised machine learning techniques to create a shared anomaly detection model and include dynamic updating features to handle the issue of concept drift (e.g., where the normal operating parameters of a machine change naturally over time).

Another aspect of certain example embodiments relates to techniques applicable across a wide variety of machinery that do not necessarily require a priori knowledge of the machine's sensor types, failure modes, operating environment, etc.

Another aspect of certain example embodiments relates to dynamic anomaly detection, e.g., in connection with the IoT and/or other similar technology areas (including, for instance, those that involve small, inexpensive sensors that are ubiquitously found in all areas of manufacturing and controlling). Although information that streams in to dedicated servers can be assessed and classified, certain example embodiments make it possible to quickly identify error situations, failing machines, etc., as well as to automatically identify a fault situation, specifically dealing with situations where (a) there initially is an empty knowledgebase (e.g., there is no comparable data available that would aid in classifying the input data), and (b) there might be concept drift (e.g., where certain readings could over time turn from an "error" to a "normal" classification, or vice versa, because certain parameters have changed).

Another aspect of certain example embodiments relates to an improved k-means algorithm, which enables the combination of the supervised and unsupervised learning techniques. An overall process description includes not only the "incremental training of the shared model," but also adds other components such as a knowledgebase, a workflow management component, a visualization component, etc.

The following example will help clarify the above-described and other related issues. Consider, for example, that power generation engines are expensive and complicated pieces of machinery. Because component failure would have potentially disastrous consequences (e.g., leaving many without power for a potentially prolonged period of time), maintenance schedules for such engines generally are very conservative. For instance, maintenance schedules oftentimes are based upon known failure rates for the engine type and frequently call for maintenance well in advance of when it might actually be required for a particular engine. This time-based maintenance approach can waste operations time by having upkeep operations performed more frequently than is necessary, and costs are increased when items that are still serviceable are nonetheless replaced. Anomaly detection approaches may be implemented to enable condition-based maintenance as opposed to a strictly time-based maintenance approach.

A supervised learning approach would involve building a knowledgebase of known failures, causes, remediation plans, etc. But building such a knowledgebase could take considerable time and expense. Once the knowledge base is built, training data would be captured for all the known engine failures, further increasing development costs. FIG. 1 shows the typical flow of this approach.

As shown in FIG. 1, a knowledgebase is built (step S102). The training data set is created (step S104). The supervised model is trained (step S106). Supervised anomalies are predicted (step S108), e.g., as sensor data is read and transformed (step S110). An operator is alerted in response to a predicted anomaly (step S112).

A multivariate unsupervised learning approach would bypass the need for a knowledgebase, but would still need the creation of a training data set gathered under normal operating conditions. Once implemented, such a system would identify significant deviations from normal engine behavior, but it likely would need to be tweaked and retrained in order to reduce the incidence of false alarms (false positives) and missed alerts (false negatives), both of which can be very expensive. As seen in FIG. 2, this approach would detect engine anomalies but likely would require constant interpretation by skilled domain experts as to what caused the engine problem and what should be done next in order to address it.

Similar to FIG. 1, FIG. 2 involves creating a training data set (step S202) and training the unsupervised model (step S204). Supervised anomalies are predicted (step S206), e.g., as sensor data is read and transformed (step S208). An operator is alerted in response to a predicted anomaly (step S210).

The approaches outlined in FIGS. 1-2 would eventually suffer from detection accuracy as the engine aged, because normal operating parameters for a brand new engine are different than those for one with ten thousand hours on it.

Certain example embodiments allow for a faster response, because they do not require the building of training data sets or knowledgebases as prerequisites. This is because certain example embodiments implement a guided learning method for training the shared anomaly detection model. Certain example embodiments also assume that the data source (e.g., sensor data) is always live and, thus, it is assumed that there is never an offline period for performing traditional batch machine learning. Therefore, certain example embodiments begin with unlabeled data only and learn the labels as they go, with the incremental help of human experts. As seen in FIG. 3, certain example embodiments begin reading live engine sensor data right away (step S302) and train a shared model incrementally (step S304), thus avoiding the delayed response typical of prior and current systems. The resulting model is able to detect and recognize repeat problems (step S306), while still discovering new problems and routing them to domain experts for review (step S308) and knowledge capture (step S310). And the model may adapt to changing operating conditions automatically as the engine ages. Over time, the initially empty knowledgebase may grow to cover additional (and potentially all) possible engine issues, and the need for a domain expert, as required by unsupervised learning approaches of prior and current systems, accordingly may fade away.

The guided learning approach of certain example embodiments uses human expert input for dynamic, incremental labeling of training data. FIG. 4 is a flowchart of the guided learning approach that may be used in connection with certain example embodiments. As will be explained in greater detail below, this approach may use business process management (BPM) technology to help coordinate the actions of the components and the human operators.

The shared model of certain example embodiments is trained incrementally using two different techniques, and predictions are made via that model.

In certain example embodiments, a system for detecting anomalies in data dynamically received from a plurality of sensors associated with one or more machines is provided. The system comprises a knowledgebase, a model store, and one or more interfaces configured to receive data from the plurality of sensors. Processing resources include at least one processor and a memory, the processing resources being configured, for each instance of data received via the one or more interfaces, to at least: classify, using a model retrieved from the model store, the respective instance as being one of a normal instance type and an anomalous instance type, the retrieved model being selected from the model store as being appropriate for the machine that produced the data in the respective instance if such a model exists in the model store; in response to a classification of the respective instance being a normal instance type, use the data in the respective instance to train the retrieved model; in response to a classification of the respective instance being an anomalous instance type that is not new, determine from the knowledgebase an action to be taken and take the determined action; and in response to a classification of the respective instance being an anomalous instance type that is new, seek confirmation from an authorized user as to whether the respective instance should be designated as a confirmed new anomalous instance type. Responsive to confirmation from the authorized user that the respective instance is a new anomalous instance type, the knowledgebase is updated with information about the respective instance and/or an action to be taken should the new anomalous instance type be detected again. The data in the respective instance is used to train the retrieved model. Each model in the model store is implemented using a k-means cluster algorithm modified so as to (a) be continually trainable as a result of the dynamic reception of data over an unknown and potentially indefinite time period, and (b) build clusters incrementally and in connection with an updatable distance threshold that indicates when a new cluster is to be created. Each said model has a respective total number of clusters that is dynamic and learned over time.

In certain example embodiments, there is provided a system for detecting anomalies in data dynamically received from a plurality of sensors, with each said sensor being associated with one or more machines. The system includes a model store, with each said machine having an associated model stored therein. One or more interfaces is/are configured to receive data from the plurality of sensors. Processing resources include at least one processor and a memory, with the processing resources being configured to train each said model using a modified k-means cluster algorithm in which there are defined a cluster initialization window p, a distance threshold t, an instance-weighting window w, a number of clusters k, clusters $c_1 \ldots c_n$, sample covariance matrices $S_1 \ldots S_k$ for respective clusters, and $\mu_1 \ldots \mu_k$ as centroids of respective clusters. Each said cluster has an associated class, with the class being one of an anomalous type class and a non-anomalous type class. For each given data stream X from a given one of the machines that includes data instances $x_1 \ldots x_n$ with a number of variables d, the modified k-means algorithm is programmed to: initialize centroid n of cluster $c_1$ as the mean of instances $x_1 \ldots x_p$, and matrix $S_1$ as the covariance of instances $x_1 \ldots x_p$, cluster $c_1$ and instances $x_1 \ldots x_p$ being predicted as normal instance types; and for each instance i from $x_{p+1} \ldots x_\infty$ in the given data stream X: (a) temporarily assign instance $x_i$ to the cluster with the nearest centroid $\mu_1, \ldots \mu_k$, (b) if the distance of $x_i$ to that centroid is greater than the distance threshold t, obtain a cluster assignment for $x_i$ from an authorized user, and (c) if the cluster assignment is for a confirmed new anomalous instance type, (a) create a new cluster $c_{j+i}$, and set centroid $\mu_{j+1}=x_i$ and covariance matrix $S_{j+1}$ as the mean of existing covariance matrices $S_1 \ldots S_j$, and (b) predict the class of $c_{j+1}$ for $x_i$; and (d) otherwise: update the centroid $\mu_j$ as the w window-weighted mean of the instances $x_i$ that have been assigned to the cluster; if the number of instances $x_i$ that have been assigned to the cluster is greater than the cluster initialization window p, update the matrix $S_j$ as the w window-weighted covariance of the instances $x_i$ that have been assigned to the cluster; and predict the class of $c_j$ for $x_i$.

Corresponding methods and non-transitory computer readable storage mediums tangibly storing instructions for performing such methods also are provided by certain example embodiments, as are corresponding computer programs.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 1 is a flowchart showing typical supervised learning that may be used in connection with an example maintenance-based approach to monitoring a power generation facility;

FIG. 2 is a flowchart showing typical unsupervised learning that may be used in connection with an example maintenance-based approach to monitoring a power generation facility;

FIG. 6 is a table showing a form that may be taken by machine sensor data that is to be processed in connection with certain example embodiments;

FIG. 7 is a table showing the data of FIG. 6 having been initially processed by an ingestion, transformation, and aggregation component in accordance with certain example embodiments;

FIG. 8 is a table showing the FIG. 7 data being labeled as either normal or anomalous in accordance with certain example embodiments;

FIG. 15 is an example display that may be created by a visualization component in accordance with certain example embodiments.

DETAILED DESCRIPTION

Certain example embodiments relate to dynamic anomaly detection in machine sensor data. In a nutshell, certain example embodiments help to take streaming data from machine sensors and turn it into intelligent alerts and recommended actions for machine operators. In this regard, FIG. 4 is a flowchart of the guided learning approach that may be used in connection with certain example embodiments, and FIG. 5 is a block diagram showing, at a high level, a system architecture 500 that may be used in connection with certain example embodiments.

Figure 3:
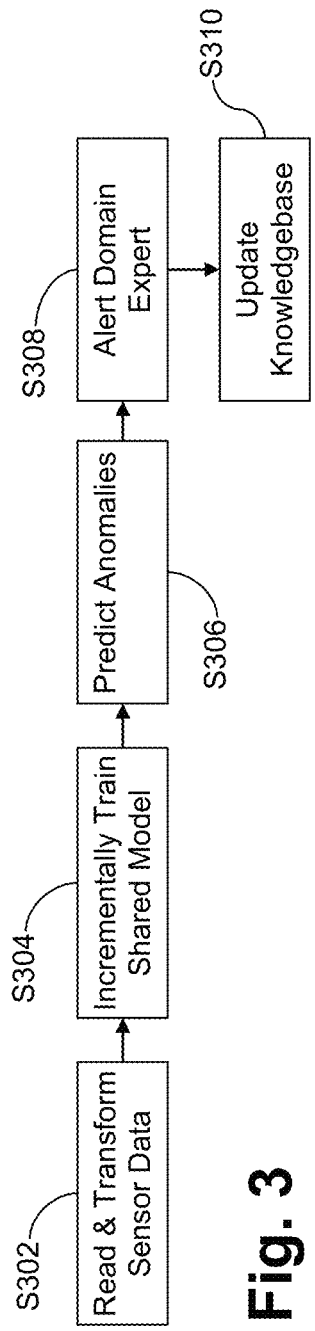
FIG. 3 is a flowchart showing an example maintenance-based approach to monitoring a power generation facility in accordance with certain example embodiments.
Figure 4:
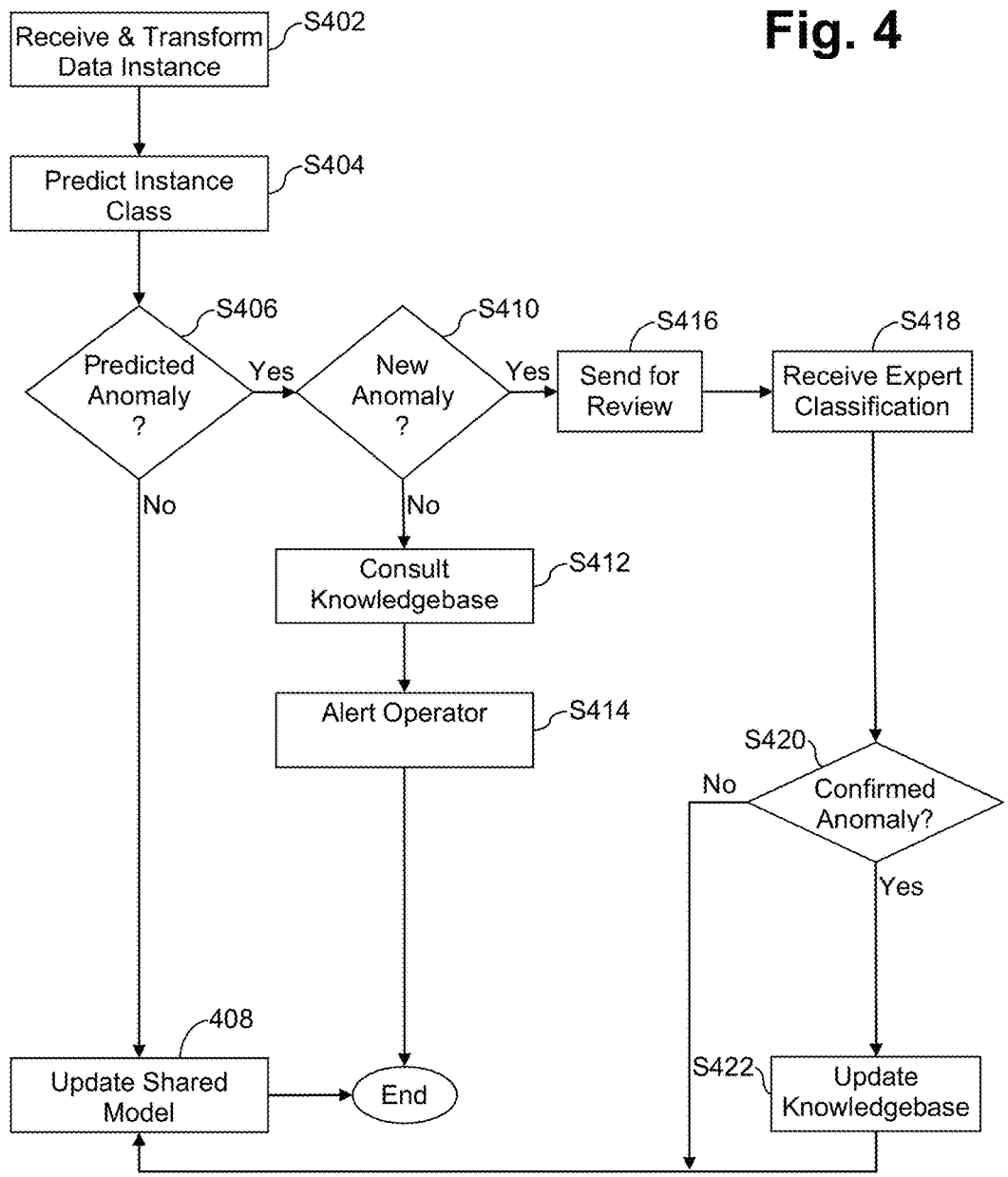
FIG. 4 is a flowchart of the guided learning approach that may be used in connection with certain example embodiments.

As shown in FIG. 4, data is received and transformed (step S402). Data from machine sensors 502a-n arrive at high speed as light packets of information. Typically, the information contained includes a timestamp of the reading, a device/machine identifier, a reading metric (e.g., voltage, current, etc.), and a reading value. Data from multiple sensors in the same time frame for the same machine may be thought of as forming an instance of machine behavior. Before any machine learning model can make use of this data, it might need to go through several transformations, such as changing from a cumulative value (monotonically increasing or decreasing values over time) to an incremental value, normalizing to a common unit of measure, changing format, etc. The data may be aggregated and grouped, such as collapsing all readings for a given machine and metric over the last five minutes into one average reading for the time period.

Figure 5:
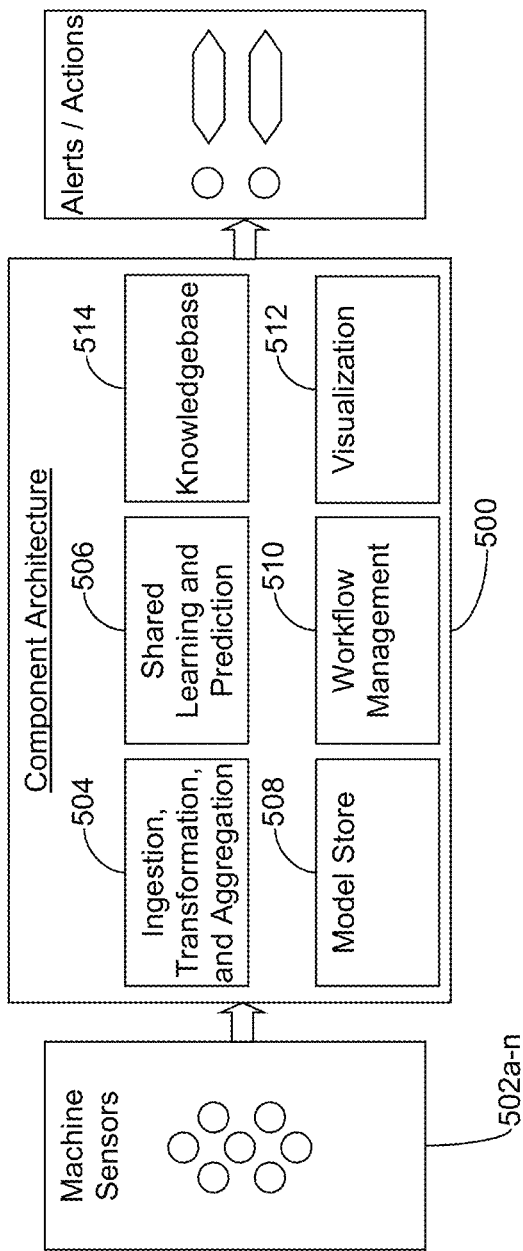
FIG. 5 is a block diagram showing, at a high level, a system architecture that may be used in connection with certain example embodiments.

This work takes place in the ingestion, transformation, and aggregation system component 504 in FIG. 5. It will be appreciated that the provision of a multipurpose streaming data aggregation component is a technical advantage of certain example embodiments, e.g., because working with high-velocity time series data can be difficult and time-consuming with traditional tools such as those used in some conventional data warehousing and/or business intelligence applications.

The class of the data that is received is predicted (step S404) using the shared learning and prediction component 506. That is, the shared learning and prediction component 506 predicts the class (normal or anomalous) of data instances as they arrive. It may do this by comparing the current instances with the model of normal behavior and identifying any significant differences. Especially in the early stages of operation, these differences might not be actual problems and might instead simply be rare or novel scenarios that the system has not seen before. It will be appreciated that even if they are actual anomalies, the unsupervised prediction technique will not be able to identify the type or cause of the problem automatically; thus, anomalies predicted using unsupervised techniques are sent to a domain expert for review.

After a few potential anomalies have been confirmed and classified by the domain expert, the shared learning and prediction component 506 is able to predict specific types of anomalies that the system has seen before. Current instances are fed to the shared model and classified as either normal or one of several anomaly types using a supervised prediction technique.

Thus, the supervised prediction technique will quickly begin detecting and providing guidance for repeat problems, while the unsupervised prediction technique will continue to be on the lookout for new problems. The complementary nature of the two predictive methods using a shared model is a technical advantage of certain example embodiments because it improves detection performance and accuracy while reducing development time. Indeed, it will be appreciated that it can be quite difficult to define a single model that can support both modes of prediction in a continuous, incremental learning approach without any batch training data.

Because the shared model is kept in the model store 508, predictions can be made with very low latency.

As will be appreciated from the description provided above, and referring once again to FIG. 4, a determination is made as to whether there is an anomaly (step S406). If there is no predicted anomaly, then the shared model is updated (step S408), and the process is ended. If there is a predicted anomaly, then a determination is made as to whether it is a new anomaly (step S410). If it is not, then the knowledgebase 514 is consulted (step S412), the operator is alerted accordingly (step S414), and the process is ended.

On the other hand, if a determination is made that it is a new anomaly, then information about the anomaly is sent for review (step S416). More particularly, if the predicted class of the data instance is anomalous, and if it is unlike other anomalies the system has seen before, the instance is sent via the workflow management component 510 to a human domain expert. The approach of using a workflow management component 510 that might be found in a business process management (BPM) suite or the like helps ensure that the right expert is notified, that the expert responds in a timely fashion, and that the response is electronically captured. The visualization component 512 may provide rich context for review of the suspected anomaly, including interactive exploration of the metrics in the proximate time window. Notifications can take the form of emails, text messages, or proprietary message formats, e.g., as required, with escalation to other experts or a supervisor, if necessary. The workflow management component 510 can, for example, help enforce a process in which the appropriate expert is notified (e.g., based on the sensor involved, the type of data produced, the perceived criticality of the event, etc.), messages are sent via escalating priorities (e.g., first via an internal tool, then via email, then via SMS, etc.), the incident is referred to others as appropriate (e.g., for confirmation, in the event that an initial expert does not respond), etc. The workflow management component 510 thus provides a technical advantage when used as a coordinator of the alerts, actions, and updates to the knowledgebase 514 and shared model. It can, for example, also help reduce development time by enforcing policies such as those described.

An expert classification about the anomaly is received (step S418). If the anomaly is confirmed as being new (in step S420), then the knowledgebase 514 is updated (step S422), the shared model is updated (step S408), and the process is ended. Otherwise, the shared model is updated (step S408), and the process is ended. In this regard, it will be appreciated that the response from the domain expert may be captured by the workflow management component 510. The expert might confirm the instance as new type of anomaly or they might classify it as a new normal operating state. Diagnostic or prescriptive maintenance information about the anomaly also may be captured by the workflow management component 510.

When it comes to updating the knowledgebase 514, it will be appreciated that at least initially the knowledgebase 514 will be empty because there is no prior knowledge about the faults or problems of the machinery being monitored. If a potential new anomaly type is confirmed by the domain expert, the knowledgebase 514 is automatically updated to include the failure type, known causes, and preferred remediation techniques provided by the expert, for later use. This incremental building of the knowledgebase 514 is a technical advantage, e.g., because it can help reduce development time and improve accuracy.

Whether anomalous or not, the new instance is fed to a mathematical model so that the model parameters for normal and anomalous operating conditions can be learned. The training of the machine learning model takes place in the shared learning and prediction component 506. It will be appreciated that multiple models (e.g., one for each machine being monitored) can be built and maintained in this same fashion. For simplicity, the techniques for only one machine will be described in this section.

A feature of certain example embodiments is that learning begins immediately with live data. That is, as the first instances come in, they are used to build a model of the characteristics of the data. Because the instances are not yet labeled, unsupervised learning techniques are used to build the initial model, and initial instances may be assumed normal. Using the unsupervised prediction techniques described below, some instances eventually will be flagged as potentially anomalous and sent for review. Once confirmed or denied, that information is fed back, and this step is repeated with the newly classified (and thus labeled) data. The initial model is then updated using supervised learning techniques so that the model can learn to discriminate between the various classes of operation. It therefore will be appreciated that certain example embodiments may use a common model that is shared for unsupervised and supervised training and prediction. It also will be appreciated that the incremental updating of the shared model is possible because of the guided learning approach of certain example embodiments.

Another feature of certain example embodiments relates to the ability to deal with concept drift as it relates to machine data. The shared model may be trained continuously, e.g., with newer instances given a higher priority than older instances when presented to the model. In this way, the model can adapt to non-anomalous but slowly changing readings caused by machine age, different environmental conditions, etc.

As noted above, the shared model is stored in the model store 508, which provides high speed access to large amounts of data. This allows the model to be maintained and executed at the rate required with IoT and/or other like streaming data.

If the predicted instance class is anomalous and of a type the system has already seen, the knowledgebase 514 is accessed by the workflow management component 510 to retrieve diagnostic and prescriptive maintenance information that will be useful for resolving the issue.

The workflow management component 510 in turn may help ensure that the right machine operator is notified and that a response is received a timely fashion. The visualization component 512 provides rich context for review of the anomaly. As above, notifications can take the form of emails, text messages, or proprietary message formats as required. Also as alluded to above, the workflow management component 510 also provides the type of failure, known causes, and preferred remediation techniques retrieved from the knowledgebase 514. This incremental dissemination of domain knowledge from the experts to the average workers can be beneficial in certain example embodiments.

It will be appreciated that the model store, knowledgebase, etc., may be backed by any suitable combination of transitory or non-transitory computer readable storage media. It also will be appreciated that the components may operate under the execution of processing resources including, for example, at least one processor and a memory coupled thereto. Standalone servers, server farms, distributed computing environments, etc., all may form suitable technological backbones for the example components discussed above.

Example Implementation

An example implementation will now be provided. It will be appreciated that other implementation approaches may be used in connection with different example embodiments.

FIG. 6 is a table showing a form that may be taken by machine sensor data that is to be processed in connection with certain example embodiments. As will be appreciated from FIG. 6, each record of data represents one reading from one machine for one sensor at one moment in time. In the FIG. 6 example, the sensors are reporting various metrics and in diverse units of measurement. The ingestion, transformation, and aggregation component 504 receives these records one at a time using any number of messaging protocols such as, for example, MQTT. In the case of metrics that are monotonically increasing, such as "Running Time" shown in FIG. 6, the ingestion, transformation, and aggregation component 504 converts the readings into incremental differences between successive readings. It also aggregates the readings so that all metrics for a given machine at a similar time are grouped together.

In certain example embodiments, the ingestion, transformation, and aggregation component 504 combines a high-speed, low latency messaging bus with a complex event processing (CEP) engine. Custom software code could also be written to perform the functions of the component, but it will be appreciated that CEP engines are well suited to performing the associated functions and generally will require only configuration to match the specific environment.

By processing the incoming events using sophisticated online algorithms, CEP systems can cope with very high data volumes (e.g., in the range of hundreds of thousands events per second) being processed and analyzed appropriately. CEP in general may be thought of as a processing paradigm that describes the incremental, on-the-fly processing of event streams, typically in connection with continuous queries that are continuously evaluated over event streams. Moreover, CEP analysis techniques may include, for example, the ability to perform continuous queries, identify time-based relations between events by applying windowing (e.g., through XQuery or SQL), etc., with the aid of processing resources such as at least one processor and a memory. See, for example, U.S. Pat. Nos. 8,640,089 and 8,266,351, as well as U.S. Publication Nos. 2014/0078163, 2014/0025700, and 2013/0046725, the entire contents of each of which are hereby incorporated herein by reference.

The output of the ingestion, transformation, and aggregation component 504 may take a similar form to the example shown in FIG. 7. As will be appreciated from FIG. 7, individual sensor readings have been grouped by timestamp and machine to capture the operational state of that machine at that time.

The shared learning and prediction component 506 receives the processed sensor data of FIG. 7. It separates out the anomalous instances and uses the normal data and unsupervised machine learning techniques to train multiple models, one for each machine being monitored.

In addition, the shared learning and prediction component 506 retrieves information from the knowledgebase 514 in the form of instances that have been deemed to be anomalous by an expert. The shared learning and prediction component 506 labels the anomalous instances and normal instances and uses them to update the shared models using supervised training techniques. An example of labeled training data is shown in FIG. 8, with a simple scheme of "n" for normal and "a" for anomalous. It will be appreciated that other example implementations may have separate labels for several different types of anomalies and/or normal states. Examples of anomaly types include bearing failures and gasket leaks, whereas examples of normal states include operating under load and idling.

In order for the models to handle concept drift and adapt to changing conditions over time, the shared learning and prediction component 506 may give stronger weights to newer data instances than older data when training the shared models as described below.

Once the shared models are trained, the shared learning and prediction component 506 predicts new anomalies by looking for instances that do not match the learned parameters of the normal instances or that match the parameters of known anomalies.

The shared learning and prediction component 506 may use a CEP engine to orchestrate the instance filtering, instance weighting, training, and prediction. The same or different CEP engines and/or engine instances may be used for the ingestion, transformation, and aggregation component 504 and the shared learning and prediction component 506 in different example embodiments. Custom software code could also be written to perform the functions of the component in certain example instances.

In certain example embodiments, the shared model itself may be implemented using a modified k-means clustering algorithm, where the current instance is predicted to be the class of its nearest cluster (in terms of a multivariate distance measure to the centroid of the cluster), whose positions are determined during training. The current instance is predicted to be a new potential anomaly if it is nowhere near any of the existing clusters in certain example embodiments.

An example unsupervised learning approach for the standard algorithm may be represented using the following pseudo-code:
1. Let X be an unlabeled data set of length n, $c_1 \ldots c_k$ be clusters, and $\mu_1 \ldots \mu_k$ be the centroids of the clusters
2. Assign $\mu_1 \ldots \mu_k$ randomly as the initial cluster centroids
3. For each instance $x_1 \ldots x_n$ in X, assign it to the cluster $c_j$ with the nearest centroid $\mu_j$
4. For each cluster $c_j$, update the centroid location with the mean of all instances $x_i$ that have been assigned to it
5. Repeat (3) and (4) until convergence
6. Return $c_1 \ldots c_k$ and $\mu_1 \ldots \mu_k$ This approach assumes that all data is already available; for instance, a large batch of sensor data was collected during a waiting period. When this algorithm has been executed completely—cluster assignment is repeated over and over until the assignments stabilize or converge—it will produce k clusters of sensor data. While the algorithm is popular for certain applications, one of its weaknesses is that the number of clusters k must be known upfront. For a general application with machine sensor data, the number of clusters of normal and anomalous behavior is unknown, making this impractical.

In addition, without labeled training data, the standard algorithm cannot predict anomalies. The clusters merely represent groupings of the data, and it is unknown whether or not a given cluster is anomalous (e.g., the clusters could just represent different normal operating states). This can be addressed by collecting labeled training data and using it to classify the clusters, and the following pseudo-code example shows how the standard k-means algorithm can be alternatively adapted for supervised learning and prediction using labeled data:

1. Let T be a labeled training data set of length n, X be an unlabeled data set, $c_1 \ldots c_k$ be clusters, $\mu_1 \ldots \mu_k$ be the centroids of the clusters
2. Set cluster centroids $\mu_1 \ldots \mu_k$ as the mean of all instances $t_1 \ldots t_n$ that have been assigned to each respective cluster
3. For each instance $x_1 \ldots x_n$ in X,
    a. Assign it to the cluster $c_j$ with the nearest centroid $\mu_j$
    b. Update the centroid location $\mu_j$ with the mean of all instances $x_i$ that have been assigned to it
    c. Predict the class of $c_j$ for $x_i$ Unfortunately, however, this approach still requires the building of an expensive and time-consuming knowledge base before any anomaly detection can begin.

In contrast, the training approach for the modified algorithm shown in pseudo-code below assumes that the data is never a fixed set, but rather is a continuous stream. The algorithm never really "finishes," per se. Instead, it continues to learn indefinitely as new instances are received. It builds the clusters incrementally, using a distance threshold parameter to decide when a new cluster is warranted. This distance threshold is learned based on the variability and distribution of the data. Also, the number of clusters k does not have to be declared upfront; rather, that may be learned over time and may continue to be dynamic as the system encounters new machine behavior.

Another difference is that instances are assigned to a cluster one time only, as opposed to the repeated assignment in the standard algorithm. This can result in some initial misclassifications at the beginning, e.g., when the model is sparse. However, unlike the standard algorithm, the centroid calculations use a weighted mean of the assigned cluster instances that are received over time. This not only increases the accuracy of the predictions as more clusters are discovered, but it is also beneficial when dealing with the concept drift that machines exhibit over time. These modifications advantageously make it possible for the algorithm to meet the requirements of clustering live sensor data.

Pseudo-code for the algorithm that may be used in connection with certain example embodiments is as follows:

1. Let X be an unlabeled data stream with instances $x_1 \ldots x_n$, d be the dimension (number of variables) of X, p be a cluster initialization window, t be a distance threshold, w be an instance-weighting window, $c_1 \ldots c_k$ be clusters, $S_1 \ldots S_k$ be the sample covariance matrices of the clusters, and $\mu_1 \ldots \mu_k$ be the centroids of the clusters
2. Initialize centroid $\mu_1$ of cluster $c_1$ as the mean of $x_1 \ldots x_p$ and matrix $S_1$ as the covariance of $x_1 \ldots x_p$
    a. Predict $c_1$ and $x_1 \ldots x_p$ as a normal class
3. For each instance i in $x_{p+1} \ldots x\infty$ in data stream X,
    a. Temporarily assign $x_i$ to the cluster with the nearest centroid $\mu_1 \ldots \mu_k$
    b. If the distance of $x_i$ to that centroid is greater than the distance threshold t,
        i. Get cluster assignment for $x_i$ from domain expert
    c. If cluster assignment is for a new class,
        i. Create new cluster $c_{j+1}$, and set centroid $\mu_{j+1} = x_i$ and covariance matrix $S_{j+1}$ as the mean of existing covariance matrices $S_1 \ldots S_j$
        ii. Predict the class of $c_{j+1}$ for $x_i$
    d. Otherwise,
        i. Update the centroid $\mu_j$ as the w window-weighted mean of the instances $x_i$ that have been assigned to the cluster (see below for example details of instance weighting),
        ii. If the number of instances $x_i$ that have been assigned to the cluster is greater than P,
            1. Update the matrix $S_j$ as the w window-weighted covariance of the instances $x_i$ that have been assigned to the cluster
        iii. Predict the class of $c_j$ for $x_i$
    e. Upon request, return clusters $c_1 \ldots c_k$ and centroids $\mu_1 \ldots \mu_k$ Thus, unlike the alternatives set forth above, the shared model of certain example embodiments—the clusters and their classes—blends both unsupervised techniques (steps 2a, 3a, and 3d) and supervised techniques (steps 3b and 3c) at the same time with each new instance of sensor data. Unsupervised clustering occurs for each new instance, as long as the instance is within the limits of existing clusters. But meanwhile, the supervised learning for the modified algorithm is ongoing. Using the guided learning approach of certain example embodiments (e.g., as detailed in connection with FIG. 4), potential anomalous instances are routed for manual review and classification by a domain expert. If they are confirmed as anomalous, the new cluster to which the instance is assigned is classified as anomalous. Thus, in real-time as the data stream is received, the shared model's clusters are elaborated with a classification from various states of normal or abnormal behavior. Prediction is then straightforward, with instances assigned to an anomalous cluster being routed directly to a human operator for resolution.

In addition to the use of a shared model and guided learning, certain example embodiments may include a number of modifications to the k-means algorithm in order to make it yet more suitable for this application of machine anomaly detection. Modifications may be provided, for example, for Mahalanobis distance measurement, recommended distance thresholds, incremental cluster mean and covariance calculations, window-based instance weighting for handling concept drift, and recommended machine-specific instance-weighting windows. Each is discussed below.

While traditional k-means uses Euclidean distance, the modified algorithm may use Mahalanobis distance to take into account the variability of the data. Mahalanobis distance automatically computes the distance to the mean (centroid) and is defined as:

$$D^2 = (x-\mu)^T S^{-1} (x-\mu) \qquad (1)$$

In this equation, x is the instance in question (a vector of length d), $\mu$ is the vector of means (centroid), $S^{-1}$ is the inverse of the sample covariance matrix, and $(x-\mu)^T$ indicates the transpose of the vector $(x-\mu)$. Equation (1) gives the squared Mahalanobis distance, and it is useful to work with it in this form because the squared distance follows a chi-square distribution with degrees of freedom equal to d, the number of dimensions of the data set.

In order to determine an appropriate distance threshold t, it is possible to use the chi-square cumulative distribution (via widely available tables) to find a value that makes sense for a given false error rate a. That value will be larger than $(\alpha-1)$ percent of all instance distances for that cluster. For example, 2-dimensional data with $\alpha$ of 0.01 would yield a squared Mahalanobis distance threshold of 9.2, and the probability that a given instance would be less than that value would be 99%. Thus, any distance larger than this is a prime suspect for an anomaly. It will be appreciated that Euclidean distance does not bring any such guidance as to the proper setting of the distance threshold, and the distance threshold typically is arrived at with via trial and error (which may not always be possible in systems that involve continuous streaming data). It also will be appreciated that other values of a may be used in different example embodiments, e.g., to fine tune the sensitivity of the system.

Because Mahalanobis distance requires an understanding of the underlying cluster distribution, the modified algorithm may keep a copy of the mean and covariance matrix for each cluster, and update them as new instances are assigned. In order to avoid the vast memory needed to store each instance assigned to a cluster across what could be a large window (see below), the algorithm may use the following formulae to perform incremental updating based on the previous values and the newly assigned instance for the first instances up to and including n=w:

$$\mu_n = \frac{(n-1)\mu_{n-1} + x_n}{n} \quad (2)$$

$$S_n = \frac{(n-1)(S_{n-1} + \mu_{n-1}^T \mu_{n-1}) + x_n^T x_n}{n} - \mu_n^T \mu_n \quad (3)$$

Equation (2) calculates the current cluster means, $\mu_n$ (a vector of length d) after n cluster assignments based on the previous means for n−1 assignments and the newly assigned instance vector $x_n$. The sample covariance matrix $S_n$ is calculated via Equation (3) using the previous covariance matrix $S_{n-1}$ and the previous means $\mu_{n-1}$.

A minimum number of instances may have to be seen in order to measure the distribution, so the algorithm just assigns the first p instances to the first cluster before starting to do cluster assignment based upon distance. And when a new cluster is first created, there is no valid distribution yet from which to calculate Mahalanobis distance, so the algorithm may make an initial assumption that the distribution is similar to those of the other clusters and thus set the initial covariance matrix to be the mean of those for existing clusters. This procedure allows centroid distances to be compared until p instances have been assigned to the new cluster, at which point the initialization assumption is replaced with the actual covariance matrix. A value of 30 for p has been found to be adequate in testing of the algorithm across multiple machine sensor data sets. It will be appreciated that other values for p may be used in different example embodiments, with the understanding that too large a value may delay initialization, whereas too small a value may cause initial misclassifications.

Finally, the parameter w establishes a novel instance-weighting window across the instances used for updating the cluster centroids and covariance matrices. This allows the effect of early misclassifications to be weaned out over time and also allows the model to adjust to concept drift. Up to the point of w instances being assigned to a cluster, the centroid and covariance calculations are performed using Equations (2) and (3). After that, each new instance is included in the calculation and combined with the previous values using weights derived from the window size. The formulae for doing this for all instances where n>w are:

$$\mu_n = \frac{(w-1)\mu_{n-1} + x_n}{w} \quad (4)$$

$$S_n = \frac{(w-1)(S_{n-1} + \mu_{n-1}^T \mu_{n-1}) + x_n^T x_n}{w} - \mu_n^T \mu_n \quad (5)$$

Figure 9:
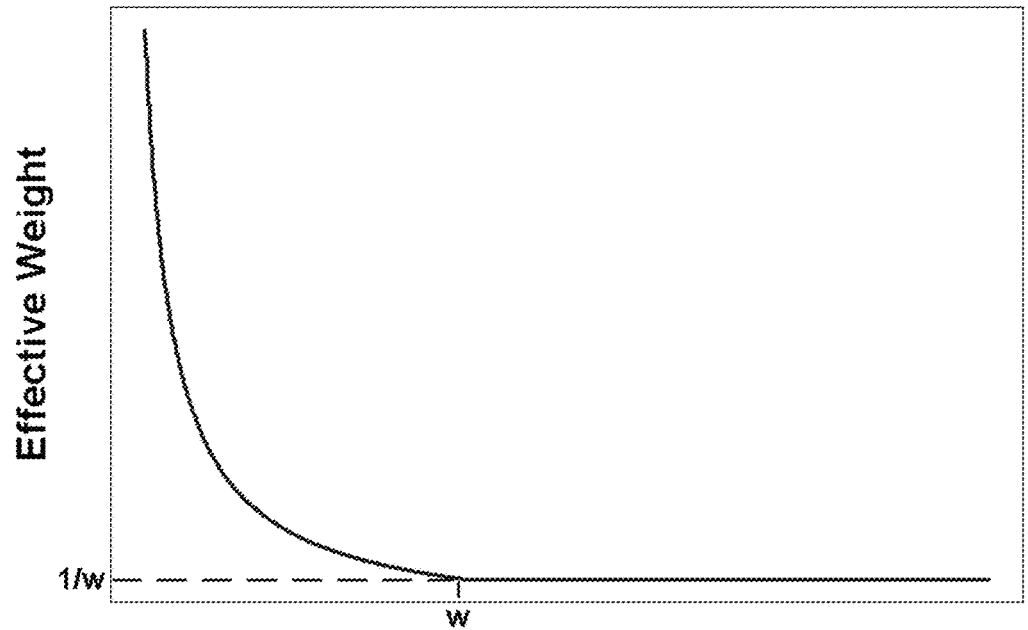
FIG. 9 is a graph plotting effective weigh versus instance, demonstrating why it is advantageous to use an instance-weighting window in certain example embodiments.

Although Equations (4) and (5) look fairly similar to Equations (2) and (3), the use of an instance-weighting window ensures the contribution of each new instance is $$\frac{1}{w},$$

and thus the clusters can adapt to concept drift with an appropriately sized window. This is illustrated in FIG. 9. The approach used before n>w is reached—if continued—would drive the contribution of new instances to approximately zero after only a few thousand instances, because each new instance assigned would have an impact of $$\frac{1}{n}$$

where n is the number of instances assigned. And therefore, any shift in the operating characteristics of the machine would be missed by the model without such a window approach.

Figure 10:
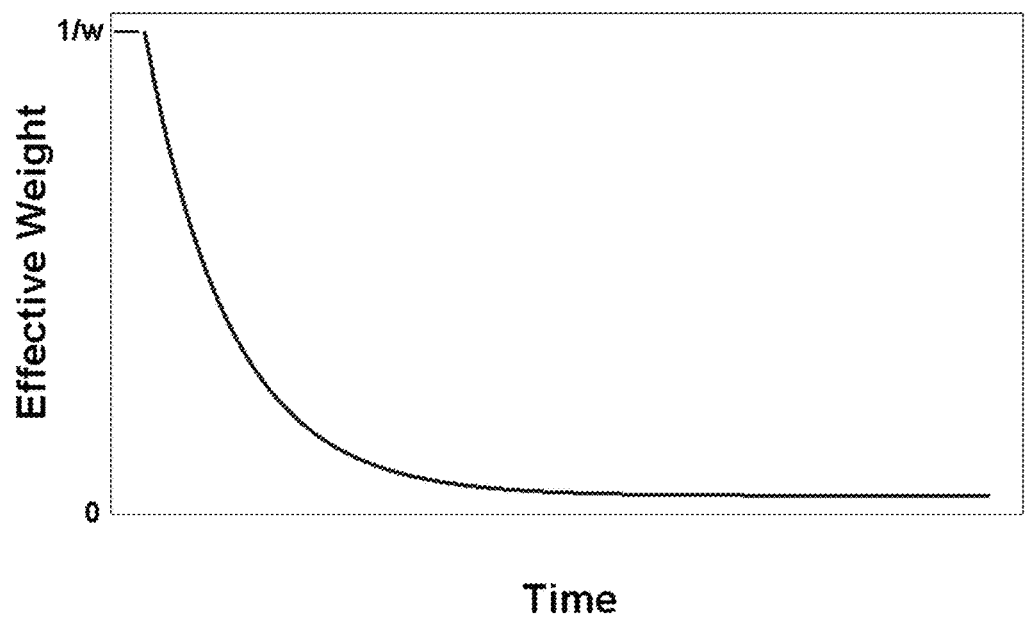
FIG. 10 is a graph showing the decrease in effective weight of a given instance over time, as more and more instances are assigned.

Viewed from another perspective, FIG. 10 is a graph showing the decrease in effective weight of a given instance over time, as more and more instances are assigned. Once n>w, a newly assigned instance starts with an effective weight of $$\frac{1}{w}$$

as mentioned above. However, as more and more instances are assigned to the cluster, the effective weight of that instance decays to approximately zero after roughly 5w additional instances are assigned. It will be appreciated that unlike a simple sliding window, the instance is never completely discarded in theory, but only the most recent 5w instances have an impact on the cluster statistics in practice. In practical terms, this instance-weighting window technique has the advantages of a sliding window for time-weighting of instances without having to store the w instances within a very large window.

Figure 11:
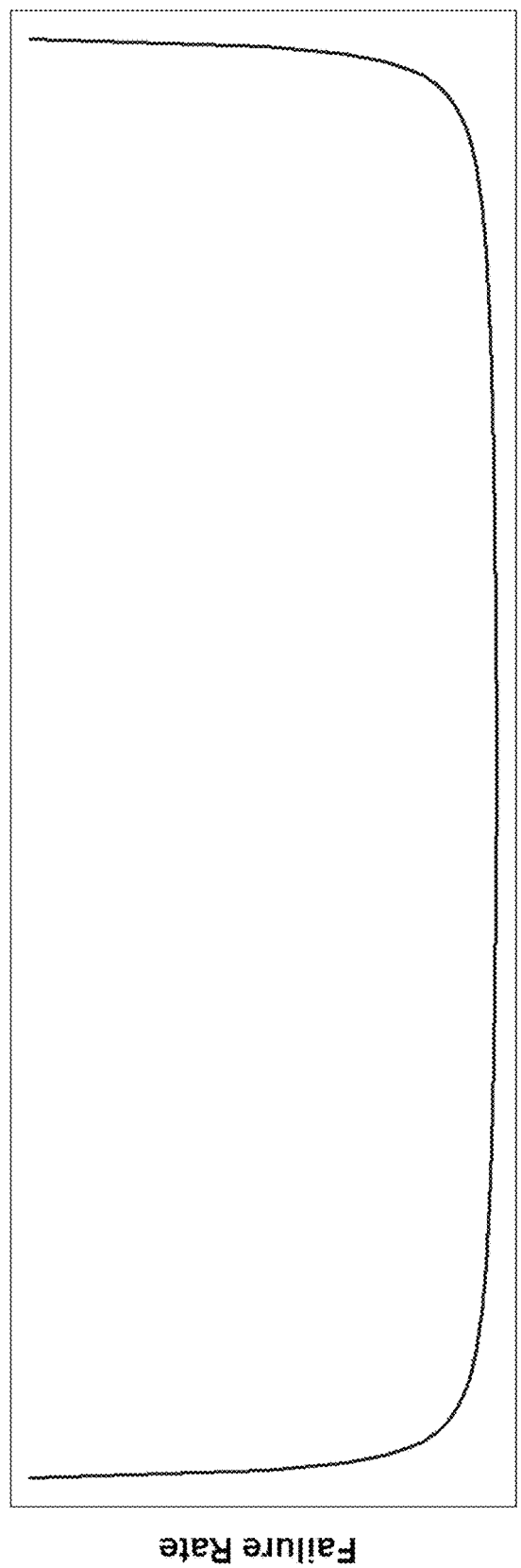
FIG. 11 is a graph illustrating the so-called "bathtub curve" as it pertains to machine reliability.

The instance-weighting window for handling concept drift in the invention is designed to deal with a concept known in machine reliability as the "bathtub curve." This term comes from studies of the probability of product failure over time. As seen in FIG. 11, for example, the failure rate for products is relatively high early in their life—a time typically called the burn-in period—but then settles down to a lower, fairly constant rate during the "useful life" period. It then rises again at the end as products wear out.

By using the novel window-based instance weighting approach of certain example embodiments, the cluster centroids and distributions are more sensitive to change at the beginning but eventually stabilize during the nearly constant failure rate of the useful life period.

The algorithmic approach of certain example embodiments leverages another concept from reliability engineering—namely, the mean time between failures (MTBF)—to set the window size. By allowing more adjustment to concept drift during the burn-in period than during the useful life period, the algorithm is more tuned to the actual life cycle of the machine being monitored and increases the accuracy of the anomaly detection. MTBF is typically given in hours, and with the sensor data sampling interval T expressed in the same units, the window size w for a given machine is calculated using Equation (6):

$$w = \frac{MTBF}{600*T} \quad (6)$$

This formula provides an instance-weighting window that is responsive enough to accommodate gradual concept drift over time while still detecting failures at the end of the useful life period. The value of 600 for the constant was determined for end-of-life failure rates typical of mechanical machines. It will be appreciated that another constant may be used in place of the 600 value used in formula (6). Values from 100 to 1,000 typically are appropriate, with smaller values generally being suitable for lower end-of-life failure rates associated with components such as electronics and bearings, and larger values generally being suitable for higher end-of-life failure rates of components such as ceramics.

Figure 12:
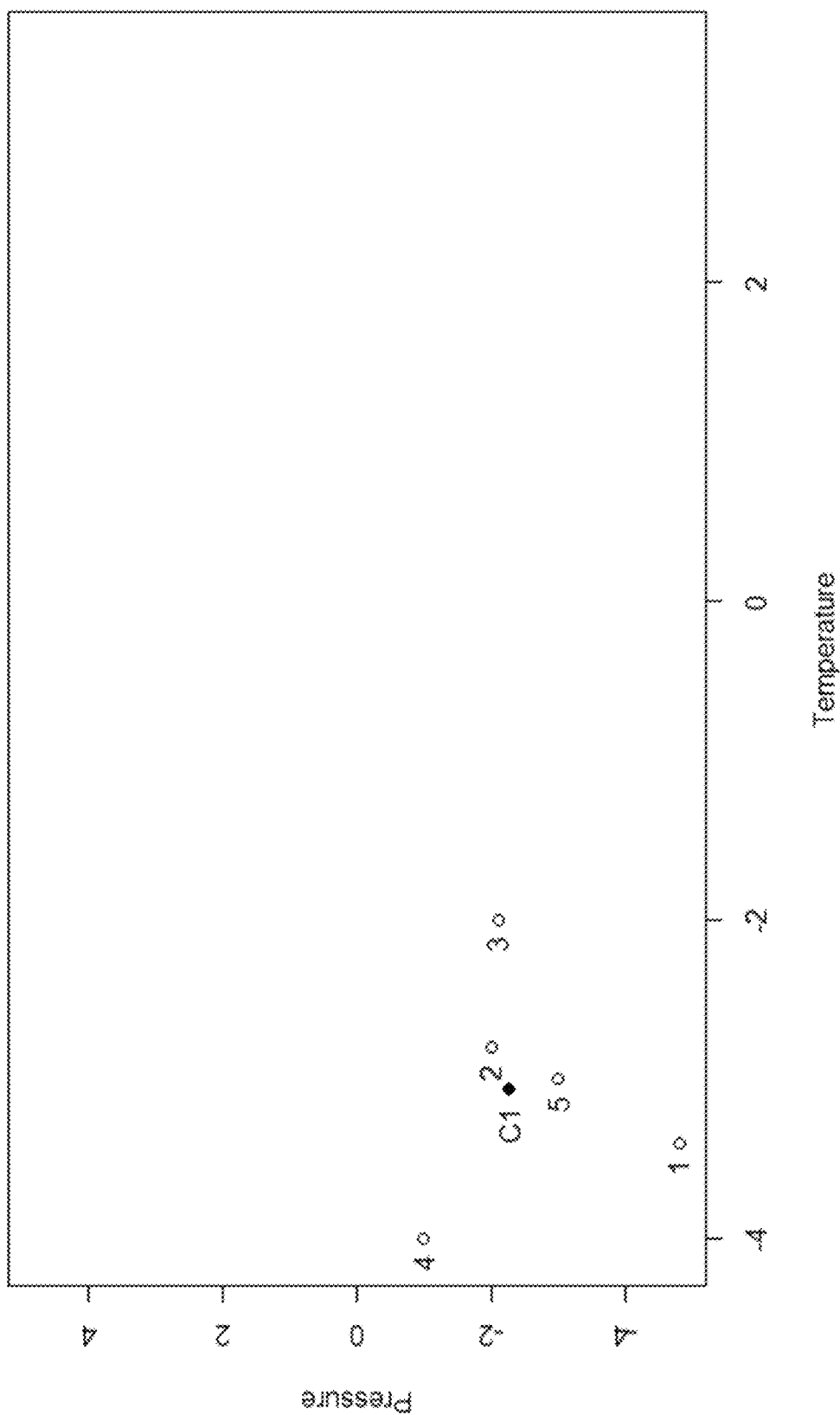
FIGS. 12-14 are graphs that show the model of certain example embodiments being used in connection with various hypothetical scenarios.

To see the shared model in action, consider the following example. Radiator temperature and pressure data from an automobile is received in a data stream. FIG. 12 shows the state of the shared model after 5 data instances have been received. The centroid of cluster $c_1$ has evolved from its initial position at instance 1 and now represents the center of the cluster. This cluster is classified as normal, and therefore so are all 5 of these instances. As can be seen, instance 4 was some distance away from instances 1-3 but not so far away as to represent a potential anomaly.

Figure 13:
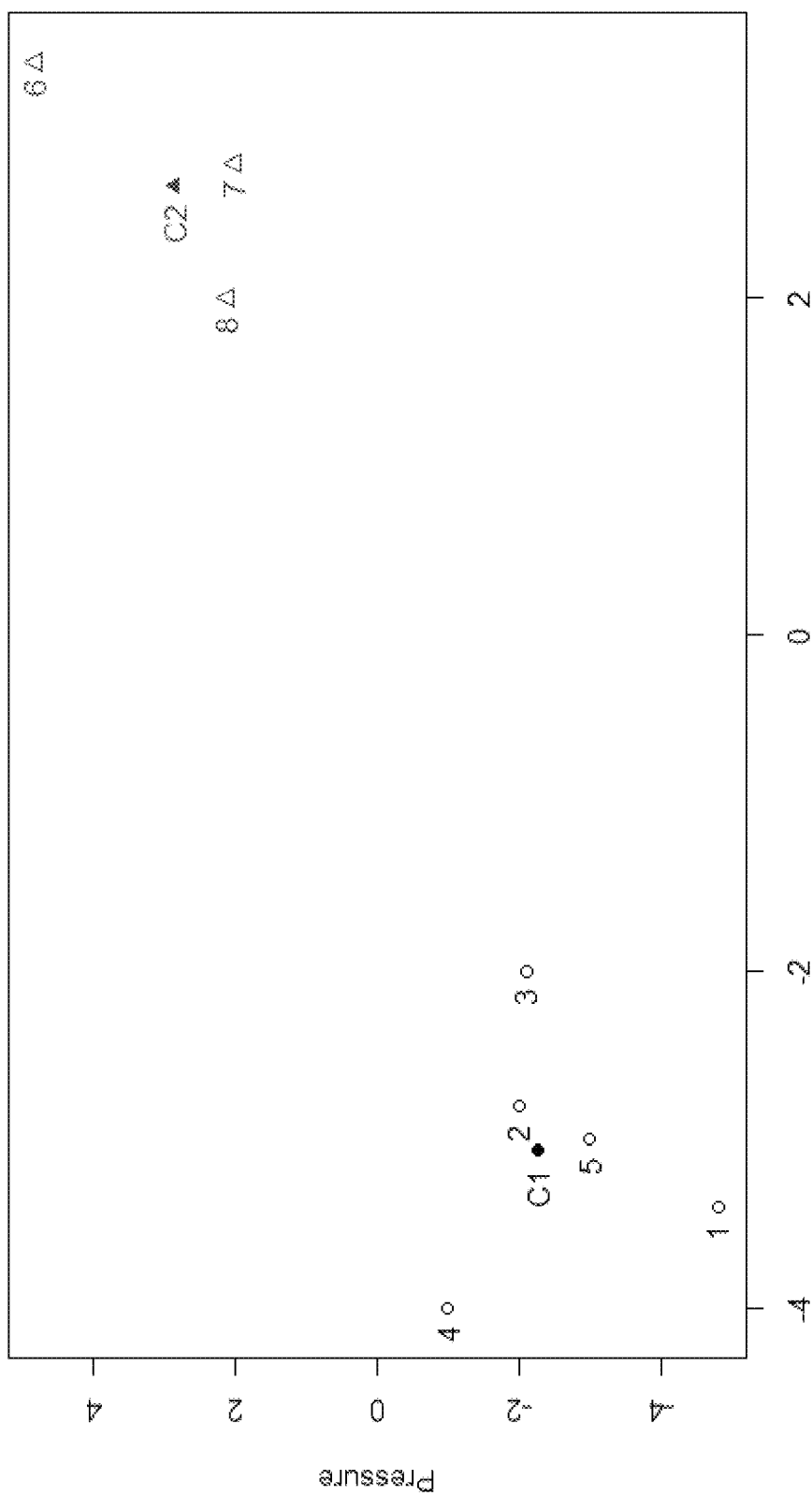

In FIG. 13, the state of the shared model after three more instances have been received is shown. Instance 6 was more than t away from the centroid of cluster $c_1$, so it was sent via the guided learning method to a domain expert for review and classification. The expert confirmed that this was indeed an anomaly, and so a new cluster was created and classified as anomalous. Instances 7-8 were also assigned to this new cluster, and the centroid of cluster $c_2$ was updated to its current position. All three additional instances are now classified as anomalous, with the latter 2 instances being sent to an operator for resolution.

Figure 14:
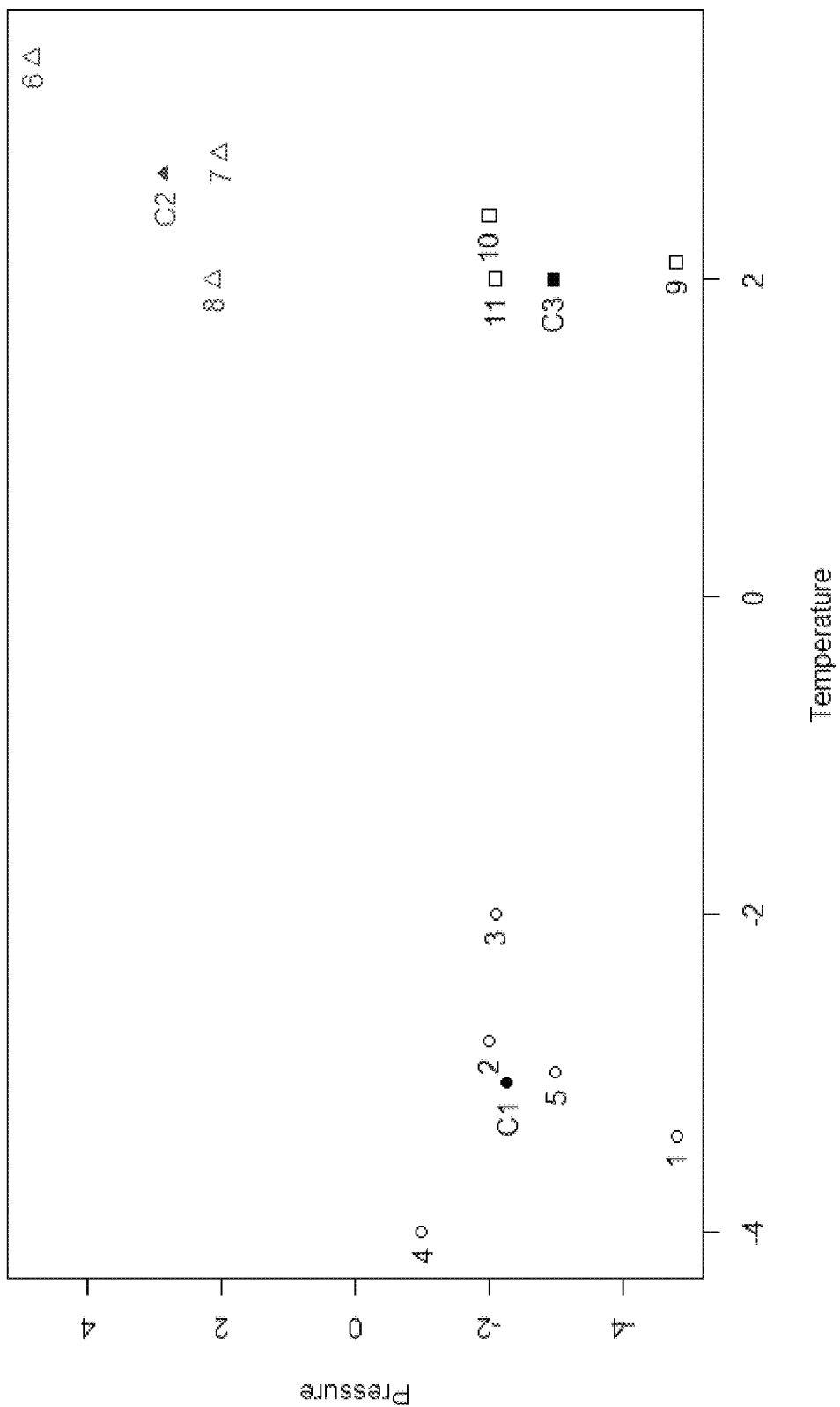

Finally, in FIG. 14, the state of the shared model after three more instances have been received is shown. Instance 9 was more than t away from centroids of clusters $c_1$ and $c_2$, so it was sent via the guided learning method to a domain expert for review and classification. In this case, the expert declared that this is normal behavior and just represented a different operational state than the original cluster. Accordingly, a new normal cluster was created, and instances 10-11 were subsequently assigned to it and classified as normal.

The primary outputs of the shared learning and prediction component 506 are the trained models, which are sent to the model store 508. These models are retrieved for predictions and updated on a regular basis. In addition, the shared learning and prediction component 506 outputs flagged instance records, along with the immediately preceding instances for context and review.

The model store 508 serves as a repository for all the trained models. It may be implemented in memory (as opposed to on disk) so that storage and retrieval can meet the demanding requirements of high velocity IoT and/or other streaming data. The inputs and outputs to the model store 508 are the models themselves, which are typically large, dense matrices of learned parameters and can also include the training data instances for some embodiments of the machine learning techniques. These models are sent from and retrieved by the shared learning and prediction component 506. Once trained, the models are very valuable artifacts and therefore need to be securely stored.

The model store 508 may be implemented with or as an in-memory data grid (IMDG) in certain example embodiments. Custom software code can also be written to perform the functions of the component, but an IMDG already combines the speed of in-memory retrieval with non-volatility and scalability, features that would take considerable effort to build from scratch. In brief, an IMDG is a data structure that resides entirely in RAM (e.g., random access memory), and is distributed among multiple servers for scalability and non-volatility. As will be appreciated, an IMDG may refer to an arrangement in which all servers can be active in each site, all data is stored in the RAM of the servers, servers can be added or removed non-disruptively (e.g., to increase the amount of RAM available), the data model is non-relational and is object-based, distributed applications (e.g., written on the .NET and Java application platforms) are supported, and the data fabric is resilient (e.g., allowing non-disruptive automated detection and recovery of a single server or multiple servers). Of course, additional and/or alternative IMDG functionality may be provided in certain example embodiments. Software AG's Terracotta Big Memory product also may be used in this regard. See, for example, U.S. Pat. No. 8,832,674, the entire contents of which are hereby incorporated herein by reference.

The workflow management component 510 orchestrates system interactions with the human domain experts and operators. It notifies the correct people according to problem assignment tables and can escalate notifications within a role/group hierarchy if no action is taken within specified time frames. It also provides a simple facility for temporary changes to the assignment tables, such as for vacation or sick time.

The primary input to the workflow management component 510 is a flagged instance record along with the immediately surrounding instances for context. It then retrieves additional context data from the knowledgebase 514 such as machine service history. For repeat anomalies previously detected, it also retrieves failure type, known causes, and recommended remediation approaches.

Along with the visualization component 512 described below, the workflow management component 510 presents relevant information to a domain expert in order for inspection and categorization of the suspected anomaly, and/or an operator in order for the recommended remediation actions to be taken. The workflow management component 510 captures the outcome of such interactions and updates the knowledgebase 514 accordingly.

The workflow management component 510 may be implemented as a BPM engine. Custom software code could also be written to perform the functions of the component, but a BPM engine is expressly designed to do this sort of human-system coordination with only configuration required for implementation. It also provides a convenient container for the charts and graphs of the visualization component 512.

The visualization component 512 displays the proximate values of all sensors for a machine under review by a domain expert or operator. In certain example embodiments, it allows for interactions with users, e.g., so that the users can filter what data they are looking at and over what time periods. It also provides a facility for "DVR-like" replay and pause of live data streams for additional context and insight in the anomaly classification task. An example of a display created by the visualization component 512 is shown in FIG. 15.

The inputs to the visualization component 512 are a flagged instance record along with the immediately surrounding instances. The only outputs are visual displays of charts and graphs.

The visualization component 512 may be implemented as a streaming/temporal data visualization system. Custom software code could also be written to perform the functions of the component, but it may be difficult to handle the high velocity and transient nature of the data. Static business intelligence dashboards would be difficult to adapt to accommodate the presentation of more dynamic data.

The knowledgebase 514 serves as a repository for all the expert knowledge about machine anomalies, problems, and failures. It is implemented in memory (as opposed to on disk) so that storage and retrieval can meet the demanding requirements of high velocity IoT and/or like streaming data. The inputs and outputs to the component are data records relating to machines, metrics, events, and remediation actions. Example records for each are shown in the following tables.

Example Machine/Device Record Format

| Field | Brief Description |
| --- | --- |
| ID | Key |
| SerialNumber | Unique Serial Number |
| ModelNumber | Model Number of Device |
| Manufacturer | e.g., a name such as GE, Boeing, etc. |
| Type | e.g., peripheral, rotary, static, switch, asset, etc. |
| Description | |
| CurrentStatusCode | Possible status values such as, for example, 01 = Green, 02 = Yellow, 03 = Red; percent output; etc. |
| CurrentErrorCode | 00 = success, but any other non-zero value may be checked with reference to an external table or the like |
| Location | |
| Lat | |
| Long | |
| AddressLine1 | |
| AddressLine2 | |
| City | |
| State | |
| Zip | |
| LastService(ID) | Identifier(s) of who last serviced the device |
| NextServiceDue(Date) | Date(s) of when the device is scheduled to be serviced |
| ServiceHistory(List) | List of service history |
| ID | |
| ErrorCodeResolved | |
| Description | |
| DateOfIssue | |
| DateOfService | |
| LinkedDevices(List) | Devices linked to this device |

Example Metric Record Format

| Field | Brief Description |
| --- | --- |
| ID | Key |
| Code | Temperature, pressure, RPM, etc. |
| Description | |

Example Event Record Format

| Field | Brief Description |
| --- | --- |
| ID | |
| DeviceSerialNumber | Foreign key reference to DeviceSerialNumber |
| Metrics(List) | e.g., temperature, pressure, etc. Look to metrics for possible values. |
| ID | |
| Value | |
| Timestamp | |
| CurrentStatusCode | Possible status values such as, for example, 01 = Green, 02 = Yellow, 03 = Red; percent output; etc. |
| CurrentErrorCode | 00 = success, but any other non-zero value may be checked with reference to an external table or the like |

Example Action Record Format

| Field | Brief Description |
| --- | --- |
| ID | |
| RelatesToDevice | Foreign key reference to DeviceSerialNumber |
| Component | e.g., bearing, filter, lubricant, etc.. |
| ID | |
| Name | |
| PartNo | |
| RemediationType | e.g., repair, replace, reburbish, etc. |
| EstTimeRequired | |
| InventoryStatus | e.g., in stock, back-ordered, etc. |

Like the model store 508, the knowledgebase 514 may be implemented in connection with an IMDG, a custom coded solution, and/or the like.

Reference is made once again to the example of monitoring a power generation engine described earlier. In this case, a new set of sensor readings arrive and are processed by the ingestion, transformation, and aggregation component 504. A time-synchronized instance is sent to the shared learning and prediction component 506, which finds that this instance is way out of bounds compared to the trained model of normality retrieved from the model store 508. It sends the suspect instance, along with supporting data, to the workflow management component 510.

The workflow management component 510 looks up the appropriate domain expert and sends a notification to them that a potential anomaly has been detected that needs review and settlement. The expert is directed to a web page containing all information needed to make a decision about the anomaly, including temporal charts and graphs provided by the visualization component 512.

After reviewing the information, the expert confirms that this is an anomaly and enters information about the nature of the problem, its cause, and what needs to be done to resolve the situation. All of this information is captured by the workflow management component 510 and is stored in the knowledgebase 514.

The shared learning and prediction component 506 is also informed that the suspect instance has indeed been judged to be anomalous, and it updates its training data to reflect this new information. The shared model is retrieved from the model store 508 and retrained. The new model now knows what this type of anomaly looks like and is ready to detect it in the future so that only standard operations personnel need to be notified to take remedial action.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape back-ups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for detecting anomalies in data dynamically received from a plurality of sensors that are associated with at least one of a plurality of machines, the system comprising:
   a knowledgebase;
   a model store; and
   processing resources including at least one processor and a memory, the processing resources being configured, for each instance of data that is received from the plurality of sensors, to at least:
     select a model from the model store based on which machine of the plurality of machines is associated with at least one corresponding sensor that provided the data;
     classify, using the selected model, the respective instance of data as being one of a normal instance type and an anomalous instance type, wherein classification of the instance of data as an anomalous instance type indicates a potential operating issue with the machine that corresponds to the selected model;
     in response to a classification of the respective instance being a normal instance type, use the data in the respective instance to train the selected model without a supervised designation of the respective instance;
     in response to a classification of the respective instance being an anomalous instance type that is not new, determine from the knowledgebase an action to be taken and take the determined action; and
     in response to a classification of the respective instance being an anomalous instance type that is new, seek confirmation from an authorized user as to whether the respective instance should be designated as a confirmed new anomalous instance type, and:
       responsive to confirmation from the authorized user that the respective instance is a new anomalous instance type, update the knowledgebase with information about the respective instance and/or an action to be taken should the new anomalous instance type be detected again; and
       train the selected model by using both the data in the respective instance and the corresponding designation from the authorized user;
   wherein each model in the model store is implemented using a k-means cluster algorithm modified to be continually trainable as a result of the dynamic reception of data over a time period, wherein clusters within each model are built incrementally and in connection with an updatable distance threshold that indicates when a new cluster is to be created; and
   wherein each said model has a respective total number of clusters that is dynamic and learned over time, wherein a given data stream X from a given one of the machines includes instances $x_1 \ldots x_n$ with a number of variables d;
   the modified k-means cluster algorithm uses a cluster initialization window p, a distance threshold t, an instance-weighting window w, a number of clusters k, clusters $c_1 \ldots c_n$, sample covariance matrices $S_1 \ldots S_k$ for respective clusters, and $\mu_1 \ldots \mu_k$ as centroids of respective clusters; and
   the modified k-means algorithm is programmed to:
     initialize centroid $\mu_1$ of cluster $c_1$ as the mean of instances $x_1 \ldots x_p$, and matrix $S_1$ as the covariance of instances $x_1 \ldots x_p$, cluster $c_1$ and instances $x_1 \ldots x_p$ being predicted as normal instance types; and
     for each instance i from $x_{p+1} \ldots x_\infty$ in the given data stream X:
       temporarily assign instance $x_i$ to the cluster with the nearest centroid $\mu_1 \ldots \mu_k$;
       if the distance of $x_i$ to that centroid is greater than the distance threshold t, obtain a cluster assignment for $x_i$ from an or the authorized user; and
       if the cluster assignment is for a confirmed new anomalous instance type, (a) create a new cluster $c_{j+1}$, and set centroid $\mu_{j+1}=x_i$ and covariance matrix $S_{j+1}$ as the mean of existing covariance matrices $S_1 \ldots S_j$, and (b) predict the class of $c_{j+1}$ for $x_i$; and
       otherwise:
         update the centroid $\mu_j$ as the w window-weighted mean of the instances $x_i$ that have been assigned to the cluster;
         if the number of instances $x_i$ that have been assigned to the cluster is greater than the cluster initialization window p, update the matrix $S_j$ as the w window-weighted covariance of the instances $x_i$ that have been assigned to the cluster; and
         predict the class of $c_j$ for $x_i$.

2. The system of claim 1, wherein the distance threshold is updatable based on the variability and distribution of the received data.

3. The system of claim 1, wherein the each said model has a respective total number of clusters that is not preset by an authorized user or programmer of the system.

4. The system of claim 1, wherein instances are assigned to clusters exactly one time.

5. The system of claim 1, wherein centroid calculations for clusters in each said model use a weighted mean of the assigned cluster instances that are received over time, at least after an initial training period.

6. The system of claim 5, wherein centroid distance calculations implement Mahalanobis distance measurement.

7. The system of claim 1, wherein the model store is configured to store one model for each machine from which data is receivable.

8. The system of claim 1, wherein the data from the sensors is received as events via a messaging buss.

9. The system of claim 8, further comprising a complex event processing (CEP) engine, the processing resources being further configured to at least receive and normalize the data that received by using the CEP engine.

10. The system of claim 1, wherein the model store is implemented in an in-memory data grid.

11. The system of claim 1, wherein classification of the respective instance being an anomalous instance type that is new is based on determination that the data of the instance is located more than a predetermined distance from the nearest cluster within the selected model.

12. The system of claim 11, further comprising a complex event processing (CEP) engine, the processing resources being further configured to at least perform the classification using the CEP engine.

13. The system of claim 1, wherein the modified k-means algorithm is further programmed to return clusters $c_1 \ldots c_k$ and centroids $\mu_1 \ldots \mu_k$ upon request.

14. The system of claim 1, wherein the modified k-means algorithm is further programmed such that:
while n≤w, perform calculations such that:

$$\mu_n = \frac{(n-1)\mu_{n-1} + x_n}{n}$$

and $$S_n = \frac{(n-1)(S_{n-1} + \mu_{n-1}^T \mu_{n-1}) + x_n^T x_n}{n} - \mu_n^T \mu_n;$$

while n>w, perform calculations such that:

$$\mu_n = \frac{(w-1)\mu_{n-1} + x_n}{w}$$

and $$S_n = \frac{(w-1)(S_{n-1} + \mu_{n-1}^T \mu_{n-1}) + x_n^T x_n}{w} - \mu_n^T \mu_n.$$

15. The system of claim 1, wherein the instance-weighting window w is equal to the mean time between failures divided by the product of a constant and the sampling interval T.

16. A system for detecting anomalies in data dynamically received from a plurality of sensors, each said sensor being associated with one or more machines, the system comprising:
a model store, each said machine having an associated model stored therein; and
processing resources including at least one processor and a memory, the processing resources being configured to train each said model using a modified k-means cluster algorithm in which there are defined a cluster initialization window p, a distance threshold t, an instance-weighting window w, a number of clusters k, clusters $c_1 \ldots c_n$, sample covariance matrices $S_1 \ldots S_k$ for respective clusters, and $\mu_1 \ldots \mu_k$ as centroids of respective clusters;
wherein each said cluster has an associated class, the class being one of an anomalous type class and a non-anomalous type class;
wherein, for each given data stream X from a given one of the machines that includes data instances $x_1 \ldots x_n$ with a number of variables d, the modified k-means algorithm is programmed to:
initialize centroid $\mu_1$ of cluster $c_1$ as the mean of instances $x_1 \ldots x_p$, and matrix $S_1$ as the covariance of instances $x_1 \ldots x_p$, cluster $c_1$ and instances $x_1 \ldots x_p$ being predicted as normal instance types; and
for each instance i from $x_{p+1} \ldots x_\infty$ in the given data stream X:
temporarily assign instance $x_i$ to the cluster with the nearest centroid $\mu_1 \ldots \mu_k$;
if the distance of $x_i$ to that centroid is greater than the distance threshold t, obtain a cluster assignment for $x_i$ from an authorized user; and
if the cluster assignment is for a confirmed new anomalous instance type, (a) create a new cluster $c_{j+1}$, and set centroid $\mu_{j+1}=x_i$ and covariance matrix $S_{j+1}$ as the mean of existing covariance matrices $S_1 \ldots S_j$, and (b) predict the class of $c_{j+1}$ for $x_i$; and
otherwise:
update the centroid $\mu_j$ as the w window-weighted mean of the instances $x_i$ that have been assigned to the cluster;
if the number of instances $x_i$ that have been assigned to the cluster is greater than the cluster initialization window p, update the matrix $S_j$ as the w window-weighted covariance of the instances $x_i$ that have been assigned to the cluster; and
predict the class of $c_j$ for $x_i$.

17. The system of claim 16, wherein the modified k-means algorithm is further programmed to return clusters $c_1 \ldots c_k$ and centroids $\mu_1 \ldots \mu_k$ upon request.

18. The system of claim 16, wherein the modified k-means algorithm is further programmed such that:
while n≤w, perform calculations such that:

$$\mu_n = \frac{(n-1)\mu_{n-1} + x_n}{n} \text{ and}$$

$$S_n = \frac{(n-1)(S_{n-1} + \mu_{n-1}^T \mu_{n-1}) + x_n^T x_n}{n} - \mu_n^T \mu_n;$$

while n>w, perform calculations such that:

$$\mu_n = \frac{(w-1)\mu_{n-1} + x_n}{w} \text{ and}$$

$$S_n = \frac{(w-1)(S_{n-1} + \mu_{n-1}^T \mu_{n-1}) + x_n^T x_n}{w} - \mu_n^T \mu_n.$$

19. The system of claim 16, wherein the instance-weighting window w is equal to the mean time between failures divided by the product of a constant and the sampling interval T.

20. The system of claim 19, wherein the constant is 600 and the cluster initialization window p is 30.

21. The system of claim 16, wherein the distance threshold t is updatable based on the variability and distribution of the received data.

22. The system of claim 21, wherein the distance threshold t is determined using a chi-square cumulative distribution commensurate with a defined false error rate and with a number of degrees of freedom equal to the number of variables in the given data stream X.

23. The system of claim 16, wherein the number of clusters k is adjustable over time.

24. The system of claim 16, wherein vector μ and covariance matrix S are incrementally updated via Mahalanobis distance calculations.

25. The system of claim 16, wherein the processing resources are further configured to cooperate with a workflow management system to at least issue alerts in response to anomalous class types being predicted.

26. The system of claim 16, wherein plural normal instance type and plural anomalous instance types are definable.

27. A method of detecting anomalies in data dynamically received from a plurality of sensors that are associated with at least one of a plurality of machines, the method comprising:
   receiving data from the plurality of sensors; and
   for each instance of data received, using processing resources including at least one processor and a memory, to at least:
      selecting a model from the model store based on which machine of the plurality of machines is associated with at least one corresponding sensor that provided the data;
      classifying, using the selected model, the respective instance of data as being one of a normal instance type and an anomalous instance type, wherein classification of the instance of data as an anomalous instance type indicates a potential operating issue with the machine that corresponds to the selected model;
      in response to a classification of the respective instance being a normal instance type, training the selected model by using unsupervised learning with the data;
      in response to a classification of the respective instance being an anomalous instance type that is not new, determining an action to be taken and take the determined action; and
      in response to a classification of the respective instance being an anomalous instance type that is new, seeking confirmation from an authorized user as to whether the respective instance should be designated as a confirmed new anomalous instance type, and:
         responsive to confirmation from the authorized user that the respective instance is a new anomalous instance type, updating a knowledgebase with information about the respective instance and/or an action to be taken should the new anomalous instance type be detected again; and
         training the selected model by using supervised learning with both the data in the respective instance and the corresponding designation from the authorized user;
   wherein each model in the model store is implemented using a k-means cluster algorithm modified to be continually trainable as a result of the dynamic reception of data over a time period, wherein clusters within each model are built incrementally and in connection with an updatable distance threshold that indicates when a new cluster is to be created; and
   wherein each said model has a respective total number of clusters that is dynamic and learned over time, wherein a given data stream X from a given one of the machines includes instances $x_1 \ldots x_n$ with a number of variables d;
   the modified k-means cluster algorithm uses a cluster initialization window p, a distance threshold t, an instance-weighting window w, a number of clusters k, clusters $c_1 \ldots c_n$, sample covariance matrices $S_1 \ldots S_k$ for respective clusters, and $\mu_1 \ldots \mu_k$ as centroids of respective clusters; and
   the modified k-means algorithm is programmed to:
      initialize centroid $\mu_1$ of cluster $c_1$ as the mean of instances $x_1 \ldots x_p$, and matrix $S_1$ as the covariance of instances $x_1 \ldots x_p$, cluster $c_1$ and instances $x_1 \ldots x_p$ being predicted as normal instance types; and
      for each instance i from $x_{p+1} \ldots x_\infty$ in the given data stream X:
         temporarily assign instance $x_i$ to the cluster with the nearest centroid $\mu_1 \ldots \mu_k$;
         if the distance of $x_i$ to that centroid is greater than the distance threshold t, obtain a cluster assignment for $x_i$ from an authorized user; and
         if the cluster assignment is for a confirmed new anomalous instance type, (a) create a new cluster $c_{j+1}$, and set centroid $\mu_{j+1}=x_i$ and covariance matrix $S_{j+1}$ as the mean of existing covariance matrices $S_1 \ldots S_j$, and (b) predict the class of $c_{j+1}$ for $x_i$; and
         otherwise:
            update the centroid $\mu_j$ as the w window-weighted mean of the instances $x_i$ that have been assigned to the cluster;
            if the number of instances $x_i$ that have been assigned to the cluster is greater than the cluster initialization window p, update the matrix $S_j$ as the w window-weighted covariance of the instances $x_i$ that have been assigned to the cluster; and
            predict the class of $c_j$ for $x_i$ . . . .

28. The method of claim 27, further comprising updating the distance threshold based on the variability and distribution of the received data.

29. A method of detecting anomalies in data dynamically received from a plurality of sensors, each said sensor being associated with one or more machines, the method comprising:
   maintaining a model store, each said machine having an associated model stored therein;

receiving data from the plurality of sensors; and using processing resources including at least one processor and a memory to train each said model using a modified k-means cluster algorithm in which there are defined a cluster initialization window p, a distance threshold t, an instance-weighting window w, a number of clusters k, clusters $c_1 \ldots c_n$, sample covariance matrices $S_1 \ldots S_k$ for respective clusters, and $\mu_1 \ldots \mu_k$ as centroids of respective clusters;

wherein each said cluster has an associated class, the class being one of an anomalous type class and a non-anomalous type class;

wherein, for each given data stream X from a given one of the machines that includes data instances $x_1 \ldots x_n$ with a number of variables d, the modified k-means algorithm is programmed to:

initialize centroid $\mu_1$ of cluster $c_1$ as the mean of instances $x_1 \ldots x_p$, and matrix $S_1$ as the covariance of instances $x_1 \ldots x_p$, cluster $c_1$ and instances $x_1 \ldots x_p$ being predicted as normal instance types; and for each instance i from $x_{p+1} \ldots x_\infty$ in the given data stream X:

temporarily assign instance $x_i$ to the cluster with the nearest centroid $\mu_1 \ldots \mu_k$;

if the distance of $x_i$ to that centroid is greater than the distance threshold t, obtain a cluster assignment for $x_i$ from an authorized user; and if the cluster assignment is for a confirmed new anomalous instance type, (a) create a new cluster $c_{j+1}$, and set centroid $\mu_{j+1}=x_i$ and covariance matrix $S_{j+1}$ as the mean of existing covariance matrices $S_1 \ldots S_j$, and (b) predict the class of $c_{j+1}$ for $x_i$; and otherwise:

update the centroid $\mu_j$ as the w window-weighted mean of the instances $x_i$ that have been assigned to the cluster;

if the number of instances $x_i$ that have been assigned to the cluster is greater than the cluster initialization window p, update the matrix $S_j$ as the w window-weighted covariance of the instances $x_i$ that have been assigned to the cluster; and predict the class of $c_j$ for $x_i$.

30. The method of claim 29, wherein the modified k-means algorithm is further programmed to return clusters $c_1 \ldots c_k$ and centroids $\mu_1 \ldots \mu_k$ upon request.

31. The method of claim 29, wherein the modified k-means algorithm is further programmed such that:

while $n \leq w$, perform calculations such that:

$$\mu_n = \frac{(n-1)\mu_{n-1} + x_n}{n} \text{ and}$$

$$S_n = \frac{(n-1)(S_{n-1} + \mu_{n-1}^T \mu_{n-1}) + x_n^T x_n}{n} - \mu_n^T \mu_n;$$

while $n > w$, perform calculations such that:

$$\mu_n = \frac{(w-1)\mu_{n-1} + x_n}{w} \text{ and}$$

$$S_n = \frac{(w-1)(S_{n-1} + \mu_{n-1}^T \mu_{n-1}) + x_n^T x_n}{w} - \mu_n^T \mu_n.$$

32. The method of claim 29, wherein the instance-weighting window w is equal to the mean time between failures divided by the product of a constant and the sampling interval T.

33. The method of claim 29, wherein the distance threshold t is determined using a chi-square cumulative distribution commensurate with a defined false error rate and with a number of degrees of freedom equal to the number of variables in the given data stream X.

34. The method of claim 29, wherein the number of clusters k is adjustable over time.

35. The method of claim 29, wherein the processing resources are further configured to cooperate with a workflow management system to at least issue alerts in response to anomalous class types being predicted.

36. A non-transitory computer readable storage medium comprising instructions that, when executed in connection with processing resources including at least one processor and a memory, aid in detecting anomalies in data dynamically received from a plurality of sensors, each said sensor being associated with one or more machines, by at least:

maintaining a model store, each said machine having an associated model stored therein;

receiving data from the plurality of sensors; and training each said model using a modified k-means cluster algorithm in which there are defined a cluster initialization window p, a distance threshold t, an instance-weighting window w, a number of clusters k, clusters $c_1 \ldots c_n$, sample covariance matrices $S_1 \ldots S_k$ for respective clusters, and $\mu_1 \ldots \mu_k$ as centroids of respective clusters;

wherein each said cluster has an associated class, the class being one of an anomalous type class and a non-anomalous type class;

wherein, for each given data stream X from a given one of the machines that includes data instances $x_1 \ldots x_n$ with a number of variables d, the modified k-means algorithm is programmed to:

initialize centroid $\mu_1$ of cluster $c_1$ as the mean of instances $x_1 \ldots x_p$, and matrix $S_1$ as the covariance of instances $x_1 \ldots x_p$, cluster $c_1$ and instances $x_1 \ldots x_p$ being predicted as normal instance types; and for each instance i from $x_{p+1} \ldots x_\infty$ in the given data stream X:

temporarily assign instance $x_i$ to the cluster with the nearest centroid $\mu_1 \ldots \mu_k$;

if the distance of $x_i$ to that centroid is greater than the distance threshold t, obtain a cluster assignment for $x_i$ from an authorized user; and if the cluster assignment is for a confirmed new anomalous instance type, (a) create a new cluster $c_{j+1}$, and set centroid $\mu_{j+1}=x_i$ and covariance matrix $S_{j+1}$ as the mean of existing covariance matrices $S_1 \ldots S_j$, and (b) predict the class of $c_{j+1}$ for $x_i$; and otherwise:

update the centroid $\mu_j$ as the w window-weighted mean of the instances $x_i$ that have been assigned to the cluster;

if the number of instances $x_i$ that have been assigned to the cluster is greater than the cluster initialization window p, update the matrix $S_j$ as the w window-weighted covariance of the instances $x_i$ that have been assigned to the cluster; and predict the class of $c_j$ for $x_i$.

* * * * *